United States Patent
Szolak et al.

(10) Patent No.: US 11,952,931 B2
(45) Date of Patent: Apr. 9, 2024

(54) EXHAUST EMISSION CONTROL DEVICE, INTERNAL COMBUSTION ENGINE EQUIPPED THEREWITH AND METHOD FOR EXHAUST EMISSION CONTROL

(71) Applicant: FRAUNHOFER-GESELLSCHAFT ZUR FÖRDERUNG DER ANGEWANDTEN FORSCHUNG E.V., Munich (DE)

(72) Inventors: Robert Szolak, Freiburg (DE); Alexander Susdorf, Freiburg (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 17/486,080

(22) Filed: Sep. 27, 2021

(65) Prior Publication Data

US 2022/0010712 A1 Jan. 13, 2022

Related U.S. Application Data

(63) Continuation of application No. PCT/EP2020/058261, filed on Mar. 25, 2020.

(30) Foreign Application Priority Data

Mar. 27, 2019 (DE) .......................... 102019204298.8
Nov. 19, 2019 (DE) .......................... 102019218204.6

(51) Int. Cl.
*F01N 3/20* (2006.01)
*F01N 3/035* (2006.01)
(Continued)

(52) U.S. Cl.
CPC .......... *F01N 3/2013* (2013.01); *F01N 3/035* (2013.01); *F01N 3/2066* (2013.01); *F01N 3/30* (2013.01);
(Continued)

(58) Field of Classification Search
CPC ............. F01N 2240/16; F01N 2240/20; F01N 2570/14; F01N 2610/03; F01N 2610/08;
(Continued)

(56) References Cited

U.S. PATENT DOCUMENTS

| | | |
|---|---|---|
| 5,340,020 A | 8/1994 | Maus et al. |
| 5,497,617 A | 3/1996 | Bagley et al. |

(Continued)

FOREIGN PATENT DOCUMENTS

| | | |
|---|---|---|
| DE | 19536853 | 4/1997 |
| DE | 19617190 | 11/1997 |

(Continued)

OTHER PUBLICATIONS

Emitec Press Release 64, IAA, Sep. 2011, including translation.
(Continued)

*Primary Examiner* — Phutthiwat Wongwian
*Assistant Examiner* — Diem T Tran
(74) *Attorney, Agent, or Firm* — Womble Bond Dickinson (US) LLP

(57) ABSTRACT

An exhaust emission control device has at least one exhaust gas line, at least one particulate filter and/or at least one exhaust gas catalytic converter connected to the exhaust gas line, and a heated catalyst assembly arranged upstream of the particulate filter and/or the exhaust gas catalytic converter. The heated catalyst assembly is designed to react fuel with exhaust gas, and has a housing provided with an inlet and an outlet connected to the exhaust gas line such that a partial flow of the exhaust gas flowing in the exhaust gas line (Continued)

can be fed through the inlet into the housing and can be discharged from the housing through the outlet back into the exhaust gas line downstream of the inlet. An exhaust emission control device of this type may be used in conjunction with an internal combustion engine, and may be used for emission control of exhaust gas.

21 Claims, 10 Drawing Sheets

(51) Int. Cl.
  *F01N 3/30* (2006.01)
  *F01N 3/36* (2006.01)
(52) U.S. Cl.
  CPC .............. *F01N 3/36* (2013.01); *F01N 3/2033* (2013.01); *F01N 2240/16* (2013.01); *F01N 2240/20* (2013.01); *F01N 2570/14* (2013.01); *F01N 2610/03* (2013.01); *F01N 2610/08* (2013.01)
(58) Field of Classification Search
  CPC ...... F01N 3/035; F01N 3/2013; F01N 3/2066; F01N 3/30; F01N 3/36
  See application file for complete search history.

(56) References Cited

U.S. PATENT DOCUMENTS

| | | | |
|---|---|---|---|
| 5,829,248 A * | 11/1998 | Clifton | F01N 3/26 60/303 |
| 8,181,445 B2 | 5/2012 | Duvinage et al. | |
| 9,074,508 B2 | 7/2015 | Szolak et al. | |
| 2003/0101713 A1 | 6/2003 | Dalla Betta et al. | |
| 2003/0217729 A1 | 11/2003 | Kaupert et al. | |
| 2004/0050037 A1 | 3/2004 | Betta et al. | |
| 2004/0178287 A1* | 9/2004 | Okamoto | F02M 61/186 239/584 |
| 2005/0000209 A1 | 1/2005 | Takahashi et al. | |
| 2005/0109019 A1 | 5/2005 | Blaschke et al. | |
| 2006/0021332 A1 | 2/2006 | Gaiser | |
| 2006/0283181 A1* | 12/2006 | Crawley | F01N 3/035 60/303 |
| 2008/0120966 A1 | 5/2008 | Sugiyama et al. | |
| 2008/0229662 A1 | 9/2008 | Aicher et al. | |
| 2010/0037607 A1 | 2/2010 | Döring | |
| 2010/0037768 A1 | 2/2010 | Döring | |
| 2010/0041543 A1 | 2/2010 | Döring | |
| 2011/0289903 A1 | 12/2011 | Döring | |
| 2013/0004374 A1 | 1/2013 | Kanba et al. | |
| 2013/0219866 A1 | 8/2013 | Szolak et al. | |
| 2014/0013729 A1* | 1/2014 | Baier | F01N 3/025 60/303 |
| 2017/0342888 A1 | 11/2017 | Noren, IV et al. | |
| 2018/0250736 A1 | 9/2018 | Oh et al. | |
| 2018/0266676 A1 | 9/2018 | Aicher et al. | |
| 2020/0370514 A1 | 11/2020 | Szolak et al. | |

FOREIGN PATENT DOCUMENTS

| | | |
|---|---|---|
| DE | 10210367 | 9/2003 |
| DE | 102004048335 | 4/2006 |
| DE | 102006060669 | 6/2007 |
| DE | 102010012945 | 9/2011 |
| DE | 102010043327 | 5/2012 |
| DE | 102017122759 | 4/2019 |
| EP | 2388451 | 11/2011 |
| JP | 2006-118401 A | 5/2006 |
| WO | WO 2019/063817 | 4/2019 |

OTHER PUBLICATIONS

Graf et al., "Optimal thermal management and Electrification in 48-V hybrids," 2018, 13 pp, including translation.
Hadl et al., "System consideration for efficient and clean diesel engines," 2017, 13 pp, including translation.
Kramer et al., "Defossilizing the transportation sector," FV Prime Movers, Technologies, 2018, 112 pp.
Stearns, "EU's Controversial Car-Pollution Test Plan Wins Final Approval," Bloomberg, Feb. 3, 2016, 13:23, 3 pp.
Voelcker, "EU Regulators Dilute New Emission Rules to Allow 2.1 Times the Legal Limits Until 2020," GreencarReports, Oct. 30, 2015, 4 pp.
International Search Report dated May 6, 2020 in PCT/EP2020/058261.
Written Opinion dated May 6, 2020 in PCT/EP2020/058261 (no translation).
Office Action issued Apr. 10, 2023 in counterpart application No. IN 202127039552.
Office Action issued Aug. 11, 2023 in counterpart application No. CN 202080024398.6.
Office Action issued Oct. 16, 2023, in counterpart Japanese Application No. 2021-557182.

* cited by examiner

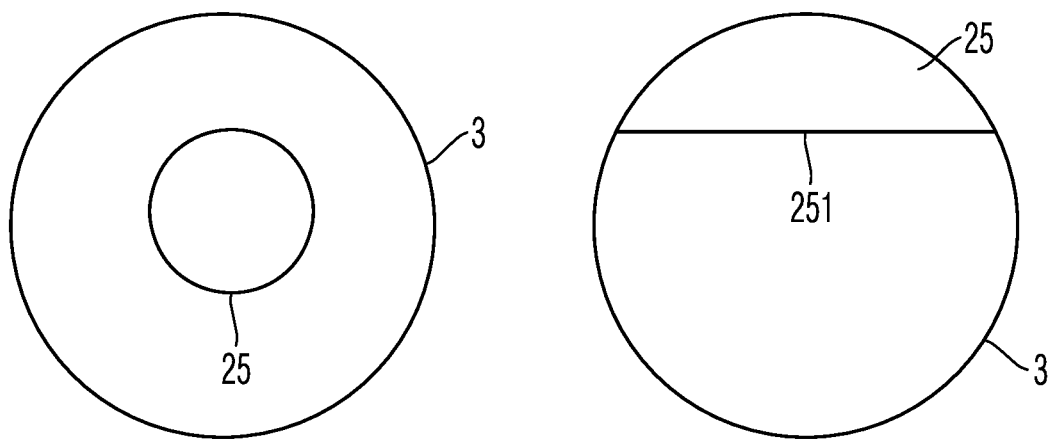
Fig. 7                    Fig. 9
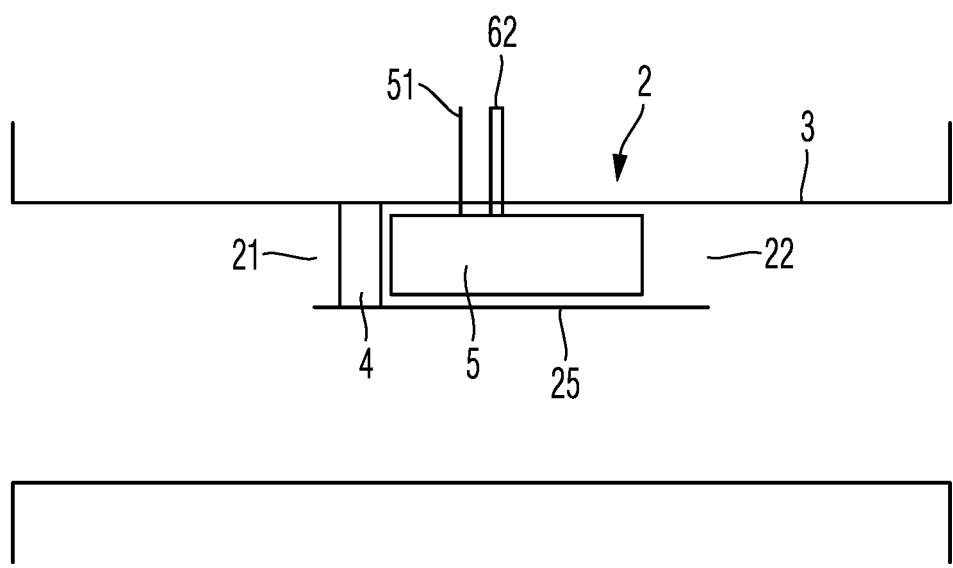
Fig. 8

EXHAUST EMISSION CONTROL DEVICE, INTERNAL COMBUSTION ENGINE EQUIPPED THEREWITH AND METHOD FOR EXHAUST EMISSION CONTROL

RELATED APPLICATIONS

This is a Bypass Continuation of International Application No. PCT/EP2020/058261, filed Mar. 25, 2020 and published as WO 2020/193595A1 on Oct. 1, 2020. Priority is claimed to DE 10 2019 204 298.8 filed Mar. 27, 2019, and to DE 10 2019 218 204.6 filed Nov. 19, 2019. The contents of the aforementioned application are incorporated by reference in their entirety.

FIELD OF THE INVENTION

The invention relates to an exhaust emission control device having at least one exhaust gas line and having at least one particulate filter connected to the exhaust gas line and/or at least one exhaust gas catalytic converter connected to the exhaust gas line. Devices of the above type can be used in motor vehicles and ships, for example passenger cars, trucks or also construction machines. In addition, these devices and methods can be used in internal combustion engines operated in an immobile fashion, e.g. for driving cable cars or power generators.

BACKGROUND

In order to reduce the pollutant emissions of internal combustion engines, it is known from practice to use exhaust gas catalytic converters in the exhaust gas set of internal combustion engines, which oxidize carbon monoxide and unburned hydrocarbons and/or reduce nitrogen oxides. In some cases, particulate filters are also used which remove microscopically small soot particles from the exhaust gas stream and, when the particulate filter is loaded, regenerate it again by oxidizing the soot particles.

All these devices and methods for exhaust emission control have in common that they require a predeterminable operating temperature or operating temperature range for an efficient operation. For example, SCR systems require a temperature of more than 200° C. for a conversion of more than 90%. A 3-way catalyst requires an operating temperature above about 300° C. For an active regeneration of a particulate filter, temperatures of more than 500° C. must be set. At lower temperatures, the efficiency of the indicated particulate filters and/or exhaust gas catalytic converters drops significantly. However, the increase in efficiency of modern engines involves that the exhaust gas temperatures are falling continuously. In many operating states, exhaust gas temperatures below 200° C. are no longer the exception but the rule. In addition, there is a need to bring the exhaust emission control up to operating temperature quickly after a cold start of the engine. This shortens the cold start phase and reduces pollutant emissions. In particular partial electrification of the drivetrain involves that route segments are traveled without the aid of the internal combustion engine which, in some circumstances, must then undergo a cold start several times during a single ride.

In order to solve this problem, it is known from Friedrich Graf, Stefan Lauer, Johannes Hofstetter, Mattia Perugini: Optimales Thermomanagement und Elektrifizierung in 48-V-Hybriden [Optimum thermal management and electrification in 48-V hybrids]; MTZ, 1 Oct. 2018, 42-47, to arrange an electric resistance heater in the exhaust gas set upstream of the exhaust gas catalytic converter. This heater can be heated with an electric heating power of 3 kW to 4 kW. The heat generated in this way is introduced into the exhaust gas catalytic converter via the exhaust gas stream so that this catalytic converter reaches its operating temperature more quickly or at all so as to render possible an efficient exhaust gas after-treatment.

A disadvantage of this known method is, on the one hand, the high electric heating power that cannot be provided by conventional 12-volt on-board power supply systems. In addition, the resistance heater is arranged in the full flow of the exhaust gas line and generates an increased exhaust gas back-pressure at full load or near-full load operating states of the internal combustion engine. This back-pressure reduces the power of the internal combustion engine and/or increases consumption.

There is therefore an unchanged need for methods and devices for exhaust emission control, which also function reliably at low exhaust gas temperatures in part-load operation, allow rapid heating of the exhaust gas after-treatment system after a cold start and, at the same time, avoid an undesirable increase in fuel consumption when the internal combustion engine operates at full load.

SUMMARY

The invention relates to an exhaust emission control device having at least one exhaust gas line and having at least one particulate filter connected to the exhaust gas line and/or at least one exhaust gas catalytic converter connected to the exhaust gas line. The invention also relates to an internal combustion engine having such an exhaust emission control device and to a corresponding method for the exhaust emission control. Devices and methods of the above mentioned type can be used in motor vehicles and ships, for example passenger cars, trucks or also construction machines. In addition, these devices and methods can be used in internal combustion engines operated in an immobile fashion, e.g. for driving cable cars or power generators.

Some embodiments of the invention propose an exhaust emission control device having at least one exhaust gas line. At least one particulate filter and/or at least one exhaust gas catalytic converter is connected to the at least one exhaust gas line. Therefore, the exhaust gas line is designed to pass the exhaust gases from the place of their generation, e.g. an internal combustion engine, to an exhaust emission control device and finally from the exhaust emission control device into the environment. For the purposes of the present description, an exhaust gas line is therefore understood to mean devices for guiding an exhaust gas stream, for example exhaust gas pipes, exhaust gas manifolds and/or a housing of an exhaust gas catalytic converter or a particulate filter.

In some embodiments of the invention, the exhaust emission control device can include at least one particulate filter. In other embodiments of the invention, at least one exhaust gas catalytic converter can be provided as an alternative or addition. An exhaust gas catalytic converter can be selected from an oxidation catalyst and/or an SCR catalyst and/or a 3-way catalyst and/or a storage catalyst. The exhaust gas catalytic converter can thus be designed to oxidize unburned hydrocarbons and/or carbon monoxide and/or nitrogen monoxide so that the proportion of these gases is reduced in the exhaust gas mass flow and the proportion of $CO_2$ and $H_2O$ is increased. Alternatively or additionally, an exhaust gas catalytic converter can be provided to reduce the proportion of nitrogen oxides (NOx), for example by reaction with $NH_3$, e.g. from urea. In some embodiments of the invention, separate exhaust gas catalytic converters can be provided for this purpose. In other embodiments of the invention, a single exhaust gas catalytic converter can render possible both the reduction of nitrogen oxides and the oxidation of carbon monoxide and hydrocarbons.

For example, the following combinations of particulate filters and/or exhaust gas catalytic converters can be connected to the exhaust gas line:
- 1st exemplary embodiment: oxidation catalyst—SCR-coated soot particulate filter—SCR catalyst—ammonia oxidation catalyst
- 2nd exemplary embodiment: NOx storage catalyst—SCR-coated soot particulate filter—SCR catalyst—ammonia oxidation catalyst
- 3rd exemplary embodiment: oxidation catalyst—soot particulate filter—SCR catalyst
- 4th exemplary embodiment: 3-way catalyst—soot particulate filter
- 5th exemplary embodiment: 3-way catalyst
- 6th exemplary embodiment: oxidation catalyst—soot particulate filter—NOx storage catalyst
- 7th exemplary embodiment: oxidation catalyst—soot particulate filter—SCR catalyst In order to bring the particulate filter and/or the at least one exhaust gas catalytic converter to operating temperature in operating states with low load and low exhaust gas temperatures or after a cold start, it is proposed according to the invention to arrange at least one heated catalyst assembly containing a heated catalyst in the partial flow of the exhaust gas set. Where reference is made in the following description and claims to "a" heated catalyst assembly, this denotes an indefinite article and not a numeral word. This does not exclude the presence of a plurality of heated catalyst assemblies or, for that matter, a plurality of different catalysts within a single heated catalyst assembly. The heated catalyst is provided to react fuel with exhaust gas. This reaction can comprise oxidation reactions and/or reforming reactions and/or cracking reactions. For this purpose, the internal combustion engine can be controlled so as to achieve an exhaust gas composition which leads to a predeterminable, preferred reaction of the fuel in the heated catalyst assembly. In addition, the reaction of the fuel in the heated catalyst assembly, which is desired in the respective operating state, can be influenced by the supplied fuel amount.

In some embodiments of the invention, the reaction of the fuel in the heated catalyst assembly, which is desired in the respective operating state, can be influenced exclusively by the supplied fuel amount while the internal combustion engine itself is operated in such a way that it optimally corresponds to the respective load requirement. For example, the internal combustion engine can be operated with optimum fuel consumption, optimum power, optimum maintenance interval or optimum torque without having to consider the resulting exhaust gas composition. Unlike required by the prior art, it is thus not mandatory to compromise the operation control of the internal combustion engine due to the requirements of exhaust gas after-treatment, resulting in increased consumption, oil dilution, thermal problems or reduced power.

For example, a reformate can be generated in the heated catalyst assembly from gasoline or diesel fuel containing comparatively long-chain hydrocarbons in a first operating state. For the purposes of the present description, a reformate is understood to mean a mixture of predominantly short-chain alkenes and/or carbon monoxide and/or hydrogen. The reformate generated in the heated catalyst assembly can already be reacted exothermically at lower temperatures on an exhaust gas catalytic converter and/or particulate filter and thus be used directly for heating these components. In the first operating state, the heated catalyst assembly is operated with $\lambda \ll 1$.

Furthermore, in a second operating state, a gasoline or diesel fuel can be largely or completely oxidized so as to introduce heat into the exhaust gas by exothermic reaction, which can be used to heat an exhaust gas catalytic converter and/or a particulate filter. In the second operating state, the heated catalyst assembly is operated with $\lambda \geq 1$. The second operating state can be selected immediately after the cold start to bring an exhaust gas catalytic converter up to ignition temperature. Subsequently, switching to the first operating state is possible, which can provide higher power to also heat downstream components, such as a particulate filter or SCR catalyst. The second operating state can be present for about 20 sec to about 120 sec after the cold start before switching to the first operating state is carried out. This can take place when an oxidation catalyst of the exhaust gas after-treatment system has reached a temperature of higher than about 150° C. or higher than about 160° C. or higher than about 180° C. or higher than about 200° C.

In a third operating state, there can be a mixed operation in which, on the one hand, heat is generated by exothermic reaction of the fuel in the heated catalyst assembly and, on the other hand, part of the fuel is reacted to give a reformate.

In addition, in any of said operating states, part of the fuel can be merely vaporized in the heated catalyst assembly without this part being chemically reacted. This fuel vapor can also be exothermically reacted on an exhaust gas catalytic converter and/or particulate filter and thus be used directly to heat these components.

In some embodiments of the invention, the exhaust gas can contain or consist of oxygen and/or nitrogen and/or nitrogen oxides and/or hydrogen and/or water and/or carbon monoxide and/or carbon dioxide and/or hydrocarbons. In some embodiments of the invention, the exhaust gas can have an oxygen content of about 14% to about 17% or about 10% to about 14%. In the heated catalyst assembly according to the invention, some or all of the above components can react with the supplied fuel.

In some embodiments of the invention, it is proposed that the heated catalyst assembly include a housing having an inlet and an outlet and being connected to the exhaust gas line such that, in at least some operating states, a partial flow of the exhaust gas flowing in the exhaust gas line can be supplied to the housing through the inlet and discharged from the housing into the exhaust gas line downstream of the inlet through the outlet. Unlike known systems, it is therefore not the full exhaust gas flow that is passed through the heated catalyst assembly, but only a partial flow. Quite surprisingly, it was found that this is sufficient to heat the exhaust gas after-treatment system and, at the same time, reduces the exhaust gas back-pressure under full load or near-full load operating states since a larger cross-section or even the entire cross-section of the exhaust gas line continues to be available for discharging the exhaust gas when the heated catalyst assembly is not required. The invention thus combines, on the one hand, a low exhaust gas back-pressure and thus a fuel-efficient operation of the internal combustion engine, in particular also in the full-load range, and, on the other hand, a rapid heating of the exhaust gas after-treatment systems after a cold start or in the lower part-load range at low generic exhaust gas temperatures.

In some embodiments of the invention, this relates to an exhaust emission control device having at least one exhaust gas line and having at least one particulate filter connected to the exhaust gas line and/or at least one exhaust gas catalytic converter connected to the exhaust gas line, wherein upstream of the particulate filter and/or the exhaust gas catalytic converter a heated catalyst assembly is arranged, which is designed to react supplied fuel with exhaust gas, wherein the heated catalyst assembly includes a housing which has an inlet and an outlet and which is connected to the exhaust gas line in such a way that a partial flow of the exhaust gas flowing in the exhaust gas line can be supplied into the housing through the inlet and can be discharged from the housing into the exhaust gas line downstream of the inlet through the outlet, the housing of the heated catalyst assembly being arranged completely within the exhaust gas line.

In some embodiments of the invention, it is possible to also supply, in some operating states, ambient air to the heated catalyst assembly in addition to the exhaust gas in order to influence the reaction of the fuel. The ambient air can be supplied to the heated catalyst assembly via the exhaust gas line or via a separate air supply device. The air supply device can be designed to control in open-loop or closed-loop fashion the amount of supplied ambient air. For this purpose, the air supply device can contain a control valve and/or a throttle valve.

In some embodiments of the invention, the partial flow passed into the heated catalyst assembly can be a proportion of about 10% to about 90%, or of about 15% to about 50%, or of about 10% to about 20%, or of about 15% to about 30%. In some embodiments of the invention, the partial flow passed through the heated catalyst assembly can also be, in some operating states, less than about 10% or less than about 5% or less than about 1% or about 0%, i.e. exhaust gas does not flow through the heated catalyst assembly when additional heating of the exhaust gas or the exhaust emission control device is not desired.

In some embodiments of the invention, the exhaust emission control device can contain a perforated plate designed to supply exhaust gas to the heated catalyst assembly. The perforated plate can be made of a metal or alloy and at least partially or fully cover the actual catalyst material or catalyst support. The perforated plate can be planar in some embodiments of the invention. In other embodiments of the invention, the perforated plate can be curved in at least one spatial direction so that it has, for example, the shape of a spherical calotte or a cylinder jacket surface.

The perforated plate contains a plurality of holes, pores or openings through which the exhaust gas flows to contact the heated catalyst assembly. The holes, pores, or openings can be arranged in a regular or irregular pattern. In some embodiments of the invention, the holes or openings can have a diameter of about 0.5 mm to about 1.5 mm, or of about 0.3 mm to about 1.0 mm, or of about 1.0 mm to about 3.5 mm. The holes, pores, or openings can have a polygonal, circular, or irregularly shaped cross-section. The number, spacing, size and arrangement of the holes or openings can be determined with a computer simulation in order to homogenize the access of the exhaust gas to the catalyst support or the heated catalyst assembly and/or to obtain the desired heating power and/or to obtain a predeterminable size of the branched-off partial flow of the exhaust gas and/or the permissible pressure loss. This can render possible efficient utilization of the entire heated catalyst assembly without creating within the heated catalyst assembly individual hotspots or space regions that are only involved to a small extent, or not involved at all, in the reaction of the fuel with the exhaust gas. In some embodiments of the invention, the perforated plate can contain or consist of a porous material, such as a sintered body or foam or woven fabric or braiding or knitwear.

In some embodiments of the invention, the heated catalyst assembly can comprise an electrically heatable support. In other embodiments of the invention, the housing and/or a housing part and/or a fuel plate and/or a perforated plate can alternatively or additionally be electrically heatable or be at least temporarily electrically heated. As a result, the heated catalyst assembly can be preheated by additional electrical energy from the on-board power supply system so that the heated catalyst assembly is initially brought to operating temperature in order to then heat the other components of the exhaust gas after-treatment system by means of chemical and electrical energy using the heated catalyst assembly. According to the invention, it is thus not necessary to electrically heat the entire exhaust gas after-treatment system and bring it to operating temperature. On the contrary, only the heated catalyst assembly can be heated electrically. Since the heated catalyst assembly can be installed close to the engine and protected from the airstream, and can have smaller dimensions than an exhaust gas catalytic converter or a particulate filter, the required electrical heating energy can be reduced.

In some embodiments of the invention, the heated catalyst assembly can include an electrically conductive support that can be heated by a resistance heating through direct current flow. In other embodiments of the invention, a heating wire can be embedded in the support and/or the housing and/or other parts of the heated catalyst assembly and/or the support of the heated catalyst assembly can be thermally connected to a wall heater.

In some embodiments of the invention, the heated catalyst assembly can be preheated with an electrical power of about 500 W to about 1500 W, or between 700 W and about 1300 W, or between about 800 W and about 1200 W, or between 500 W and about 4000 W, or between about 700 W and about 3000 W, or between 800 W and about 2000 W. Because the heated catalyst assembly has a lower heat capacity compared to the exhaust gas catalytic converter due to its smaller dimensions, the heated catalyst assembly can reach its operating temperature in a short time. In some embodiments of the invention, the electrical heating can be operated between about 5 s and about 60 s, or between about 10 s and about 30 s, or between about 5 s and about 20 s. In some embodiments of the invention, the electrical heating can be operated until the heated catalyst assembly reaches a temperature of about 200° C. to about 700° C., or of about 300° C. to about 500° C., or of about 250° C. to about 350° C.

In some embodiments of the invention, a fuel plate can be arranged on the side of the heated catalyst assembly that is opposite the perforated plate. The fuel plate causes a homogeneous distribution of the fuel so that it comes into uniform contact with the heated catalyst assembly or the catalyst support. For this purpose, the fuel can be applied to the fuel plate by means of a pump, where it runs to form a thin film. Heat is introduced into the fuel plate by convection and radiation so that the fuel film vaporizes and penetrates the catalyst support of the heated catalyst assembly as it rises. As already described, this is where the fuel is reacted with the exhaust gas so that heated exhaust gas, reformate and/or fuel vapor can be released into the exhaust gas line. In order to allow uniform heating of the fuel plate, this plate can be made of a metal or alloy with good thermal conductivity, e.g. of aluminum or copper.

In some embodiments of the invention, the fuel plate can be provided with a capillary transport device. Such a capillary transport device can be made in the form of milled, etched or additively manufactured channels. The shape, number and size of such channels can, in turn, be optimized in computer simulations to render possible uniform distribution of fuel on the fuel plate. In other embodiments of the invention, a nonwoven fabric, woven fabric, knitwear, foam, and/or wick can be arranged on the fuel plate, which due to capillary forces result in the transport of the fuel within the plane defined by the fuel plate.

In some embodiments of the invention, the housing of the heated catalyst assembly can have a diameter or circumference between about 55 mm and about 120 mm or between about 65 mm and about 100 mm. The height of such a housing can be between about 20 mm and about 50 mm. As a result, the heated catalyst assembly requires very little installation space and has low thermal masses, which leads to the rapid response of the heated catalyst assembly. Nevertheless, the chemical and electric heating power provided by the heated catalyst assembly is large enough to rapidly heat up common exhaust gas after-treatment systems to operating temperature. Of course, larger heated catalyst assemblies can also be used for large engines, for example for the use in trucks, ships, construction machines or for stationary operation.

In some embodiments of the invention, a pressure reduction device can be provided in the exhaust gas line between inlet and outlet. This device can generate a differential pressure with the effect that the exhaust gas pressure at the inlet of the heated catalyst assembly is greater than at the outlet of the heated catalyst assembly so that a partial flow of the exhaust gas flows through the inlet into the housing of the heated catalyst assembly and leaves the heated catalyst assembly again via the outlet. In some embodiments of the invention, the pressure difference generated by the pressure reduction device can be between about 5 mbar and about 50 mbar or between about 8 mbar and about 30 mbar. The pressure difference generated by the pressure reduction device can be greater than the pressure loss occurring when fluid flows through the heated catalyst assembly. This ensures that a sufficiently large partial flow of the exhaust gas is passed through the heated catalyst assembly.

In some embodiments of the invention, the pressure reduction device can be switchable so that it generates a greater exhaust gas back-pressure in a first operating state and generates a lower exhaust gas back-pressure in a second operating state. Thus, in operating states requiring operation of the heated catalyst assembly, the exhaust gas back-pressure at the inlet of the heated catalyst assembly can be increased so that an appreciable partial flow of the exhaust gas flows through the heated catalyst assembly. When the heated catalyst assembly is not required, the exhaust gas back-pressure of the pressure reduction device can be reduced in order to only impair the gas exchange of the internal combustion engine at full load to a minor extent.

In some embodiments of the invention, the pressure reduction device can be controllable so that the partial flow passing through the heated catalyst assembly can be controlled to a predeterminable target value.

In some embodiments of the invention, the pressure reduction device can be selected from a throttle valve and/or a mixer and/or a turbine of a turbocharger. In the latter case, the inlet of the heated catalyst assembly can be on the inlet side of the turbine of the turbocharger and the outlet on the outlet side of the turbocharger. Thus, the pressure loss generated by the turbine anyway is simultaneously used to allow the flow through the heated catalyst assembly.

In some embodiments of the invention, a shut-off valve can be provided at the inlet of the heated catalyst assembly. The shut-off valve can be a solenoid valve or include a solenoid valve or can be moved by an actuator. In this way, the full exhaust gas flow can be passed through the exhaust gas line without a partial flow passing through the heated catalyst assembly when the heated catalyst assembly is not needed. In this way, deposits from the exhaust gas flow can be avoided in the heated catalyst assembly and the service life can be increased.

In some embodiments of the invention, the housing of the heated catalyst assembly can be arranged entirely within the exhaust gas line. This allows for a compact and mechanically resistant design so that the operational reliability can be increased. For this purpose, the cross-section of the exhaust gas line can be enlarged, in some embodiments of the invention, in a longitudinal section in which the heated catalyst assembly is arranged.

BRIEF DESCRIPTION OF THE DRAWINGS

The invention shall be explained in more detail below by means of embodiments and drawings without limiting the general concept of the invention, wherein:

FIG. 7 shows a cross-section of a heated catalyst assembly according to the invention in a second embodiment.

FIG. 8 shows a longitudinal section of a heated catalyst assembly according to the invention in a third embodiment.

FIG. 9 shows a cross-section of a heated catalyst assembly according to the invention in a third embodiment.

DETAILED DESCRIPTION

Figure 1:
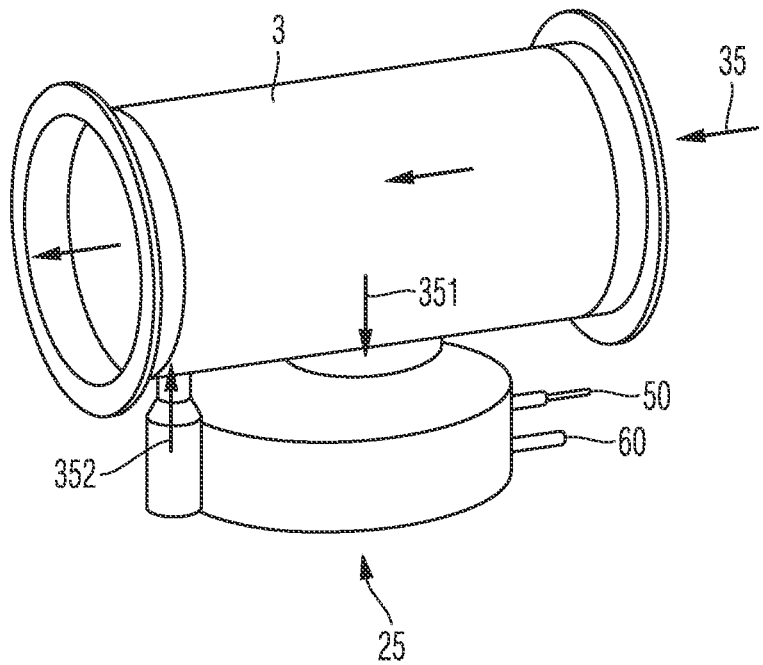
FIG. 1 shows a view of a first embodiment of a heated catalyst assembly according to the invention.
Figure 2:
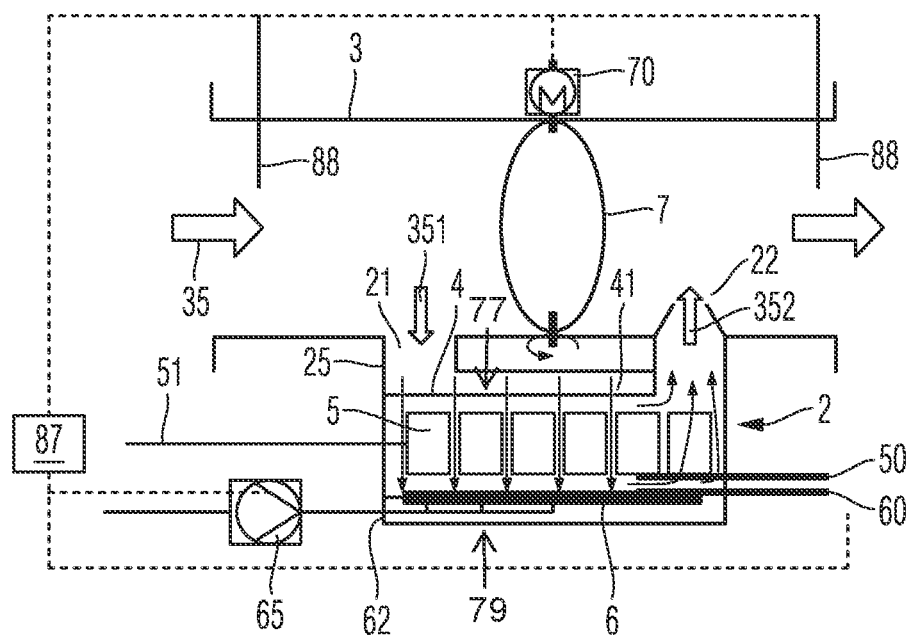
FIG. 2 shows the cross-section through the heated catalyst assembly according to the first embodiment.
Figure 3:
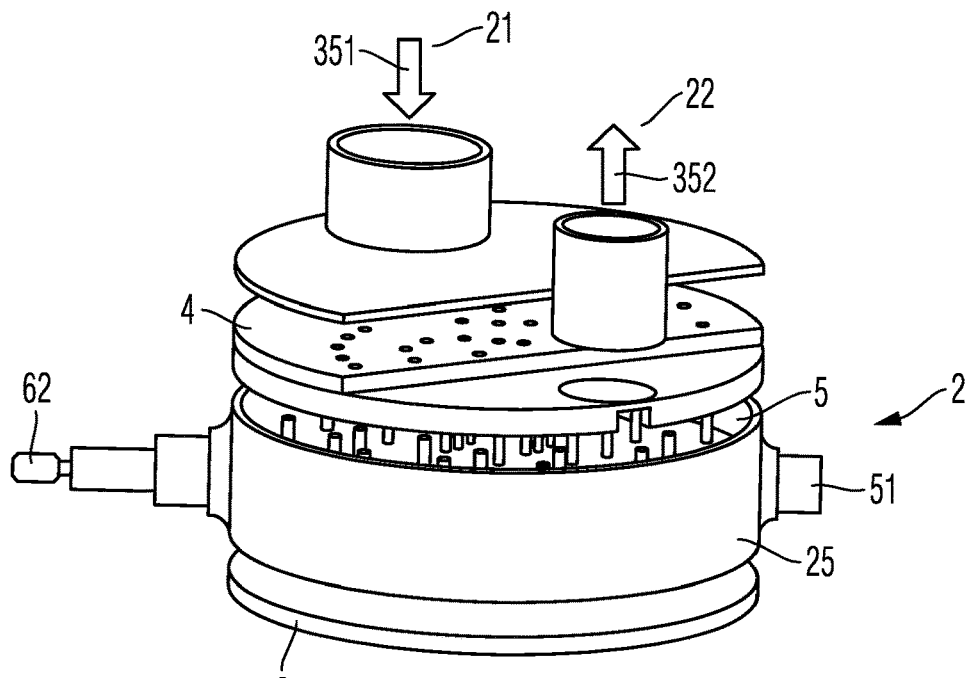
FIG. 3 shows an exploded drawing of a heated catalyst assembly according to the first embodiment.

FIGS. 1, 2 and 3 illustrate a first embodiment of the heated catalyst assembly according to the invention. FIGS. 1 and 2 here show a part of an exhaust gas line 3. The exhaust gas line 3 is designed to receive an exhaust gas stream 35, which originates e.g. from an internal combustion engine.

As can is also clear from FIGS. 1 and 2, the exhaust gas stream 35 is passed substantially in a straight line through the exhaust gas line 3. Only a partial flow 351 is passed into the housing 25 of the heated catalyst assembly 2 via the inlet 21. The partial flow 351 branched off in this way can be between about 10% and about 50% or between about 15% and about 30% of the total exhaust gas stream flowing in the exhaust gas line 3.

As shown in particular in FIG. 2, the exhaust gas stream 351 entering through the inlet 21 is supplied to a first side 77 of the catalyst support 5 via a perforated plate 4. The perforated plate 4 can contain or consist of a ceramic material, a metal or an alloy. The perforated plate 4 further has a plurality of holes 41 through which the exhaust gas can enter. The number, size and distribution of the holes 41 can be determined in a computer simulation so as to distribute as homogeneously as possible the exhaust gas in the catalyst support 5.

In a manner known per se, the catalyst support 5 can be, for example, a sintered body, a honeycomb body, a foam or another porous molded body that is permeable to exhaust gas. For this purpose, the catalyst support 5 can be made of a metal, an alloy or a ceramic material. The catalyst support 5 can be provided with an electrical heating device so that it can be heated with a heating power between about 500 W and about 1500 W. For this purpose, an electrical connection 51 is used through which electrical heating energy can be introduced into the catalyst support 5. The temperature of the catalyst support 5 can be detected and controlled in open-loop or closed-loop fashion by means of a temperature sensor 50.

Finally, a fuel plate 6 is located on a second side 79 of the catalyst support 5 opposite the catalyst support's first side 77 where the perforated plate 4 is located. The fuel plate 6 can contain or consist of a metal or an alloy and optionally is provided with a capillary transport device. As a transport device, for example, channels can be introduced into the surface of the fuel plate 6 which allow a capillary transport of the fuel so that it is distributed as homogeneously as possible in a thin film over the surface of the fuel plate 6 facing the catalyst support 5. Fuel enters the housing 25 via the fuel supply connection 62 and is supplied to the second side 79 of the catalyst support 5. Thus, exhaust gas and fuel are supplied to the catalyst support 5 in opposite directions. The supply of the fuel can be controlled in an open-loop or closed-loop fashion by a pump 65. In some embodiments of the invention, the fuel applied to the fuel plate 6 is taken from the main tank of the internal combustion engine. For example, the fuel can be gasoline or diesel fuel or natural gas or LPG. In other embodiments of the invention, a fuel specifically provided for heating the exhaust gas after-treatment system can be applied to the fuel plate 6, e.g. an alcohol or white spirit.

Heat is introduced into the fuel plate 6 by the exhaust gas flowing through the catalyst support 5 by convection and radiation. This causes the fuel to vaporize. The fuel vapor then rises into the catalyst support 5 where it is reacted exothermically with the exhaust gas. The resulting heat is partially supplied to the exhaust gas, so that the exhaust gas stream 352 flowing from the outlet 22 into the exhaust gas line 3 is heated relative to the incoming exhaust gas stream 351. In addition, the exhaust gas stream 352 introduced into the exhaust gas line 3 contains components of the fuel reacted at the catalyst support 5, for example a reformate.

In some embodiments of the invention, it is possible to initially select, after a cold start, a first operating state in which the fuel is predominantly oxidized with the exhaust gas. This generates primarily heat by exothermic reaction, which is used to heat the exhaust gas after-treatment system. In this first operating state, the catalyst support 5 can optionally be electrically heated at least at times. The air ratio $\lambda$ of the heated catalyst assembly can be selected between about 0.7 and about 1, and in some embodiments also greater than 1.

In a second operating state of the heated catalyst assembly, the fuel can be predominantly reacted to a reformate containing or consisting of a mixture of predominantly short-chain alkenes and/or carbon monoxide and/or hydrogen. This reformate is subsequently oxidized at a particulate filter and/or an exhaust gas catalytic converter, the resulting heat being introduced directly into these components. For this purpose, the heated catalyst within the heat catalyst assembly 2 is operated substoichiometrically, i.e. the air ratio $\lambda$ of the heated catalyst is between about 0.05 and about 0.7 or between about 0.1 and about 0.4.

Switching between the first and second operating state can be accomplished by adjusting the supplied fuel amount and/or by adjusting the exhaust gas composition and/or by supplying ambient air. The exhaust gas composition can be influenced by, among other things, selection of the injected fuel amount, the boost pressure, the throttle valve position, the number and duration of the individual injections, the injection or ignition timing, the opening duration of the intake and exhaust valves, the opening stroke, and/or the position of an exhaust gas recirculation valve. Preferably, but not necessarily, switching between the first and second operating state is performed by adjusting the supplied fuel amount, which is selected for this purpose on the basis of the exhaust gas composition. The exhaust gas composition can be measured at least in part, for example by a lambda probe. Alternatively or additionally, the exhaust gas composition can be extrapolated from the characteristic maps of the internal combustion engine, so that as a result the fuel amount supplied to the heated catalyst assembly can be determined from the characteristic maps or ranges of characteristic maps present in the respective operating state of the internal combustion engine.

In some embodiments of the invention, the switching between the first and the second operating state can be cyclic so that there are multiple changes between heat input and reformate generation.

In some embodiments of the invention, a plurality of heated catalyst assemblies can be provided so that the first and second operating state can also be applied simultaneously.

In some embodiments of the invention, the temperature of the fuel plate 6 can be used to control the flow rate of the pump 65, which is detected by an optional temperature sensor 60.

FIG. 2 also shows a pressure reduction device 7, which in the illustrated example contains a throttle valve, the angle of attack of which can be influenced by an actuator 70. Therefore, the pressure reduction device can be closed after the cold start so that a sufficiently large pressure difference is established between the inlet 21 and the outlet 22 so that a partial flow 351 of the exhaust gas flow 35 flows through the housing 25 of the heated catalyst assembly 2. The pressure reduction device 7 can also have the effect that turbulent wake vortices are formed downstream of the pressure reduction device, which ensures efficient mixing of the partial flow 352 leaving the housing 25 of the heated catalyst assembly 2 with the main flow flowing in the exhaust gas line 3. If the exhaust gas temperature is so high that additional heating of the exhaust emission control device is not required, the throttle valve 7 can be fully open. As a result, approximately the same exhaust gas pressure is present at the inlet 21 and at the outlet 22 so that the exhaust gas does not flow, or only flows to a small extent, through the heated catalyst assembly 2. The device according to the invention then does not have an exhaust gas back-pressure that is significantly higher than that of known exhaust gas systems without a heated catalyst assembly, which can result in a power and/or consumption advantage under full load or near-full load operating states.

Finally, FIG. 2 shows temperature sensors 88 that determine the exhaust gas temperature upstream and downstream of the pressure reduction device 7. This can ensure that no excessively hot exhaust gas is introduced into the catalyst support 5, which could lead to the destruction of the heated catalyst assembly 2. Furthermore, it is ensured that not so much energy is supplied in the heated catalyst assembly that the exhaust gas flow exceeds a predeterminable maximum temperature.

The pressure reduction device 7, the fuel supply via the pump 65, and the electrical heating energy of the catalyst support 5 can be controlled via an open-loop or closed-loop control device 87 in such a way that the heated catalyst assembly is controlled in open-loop or closed-loop fashion in an optimum way on the basis of the operating state.

FIG. 3 again shows the housing 25 of a heated catalyst assembly 2 in an exploded drawing. The fuel plate 6 on the underside and the perforated plate 4 on the upper side of the catalyst support 5 can be identified. Electric heating energy and fuel can be supplied via the connections 62 and 51. The upper side of the approximately cylindrical housing includes the inlet 21 and the outlet 22, through which the exhaust gas flow 351 enters the housing 25 and the modified exhaust gas flow 352 leaves the housing of the heated catalyst assembly 2.

The heated catalyst assembly 2 has a compact design and a high power density between about 30 kW/l and about 60 kW/l. In addition, the thermal power output can be adjusted in a wide range, for example between about 1 kW and about 18 kW, so that the modulation range is between about 1:16 and about 1:20.

Figure 4:
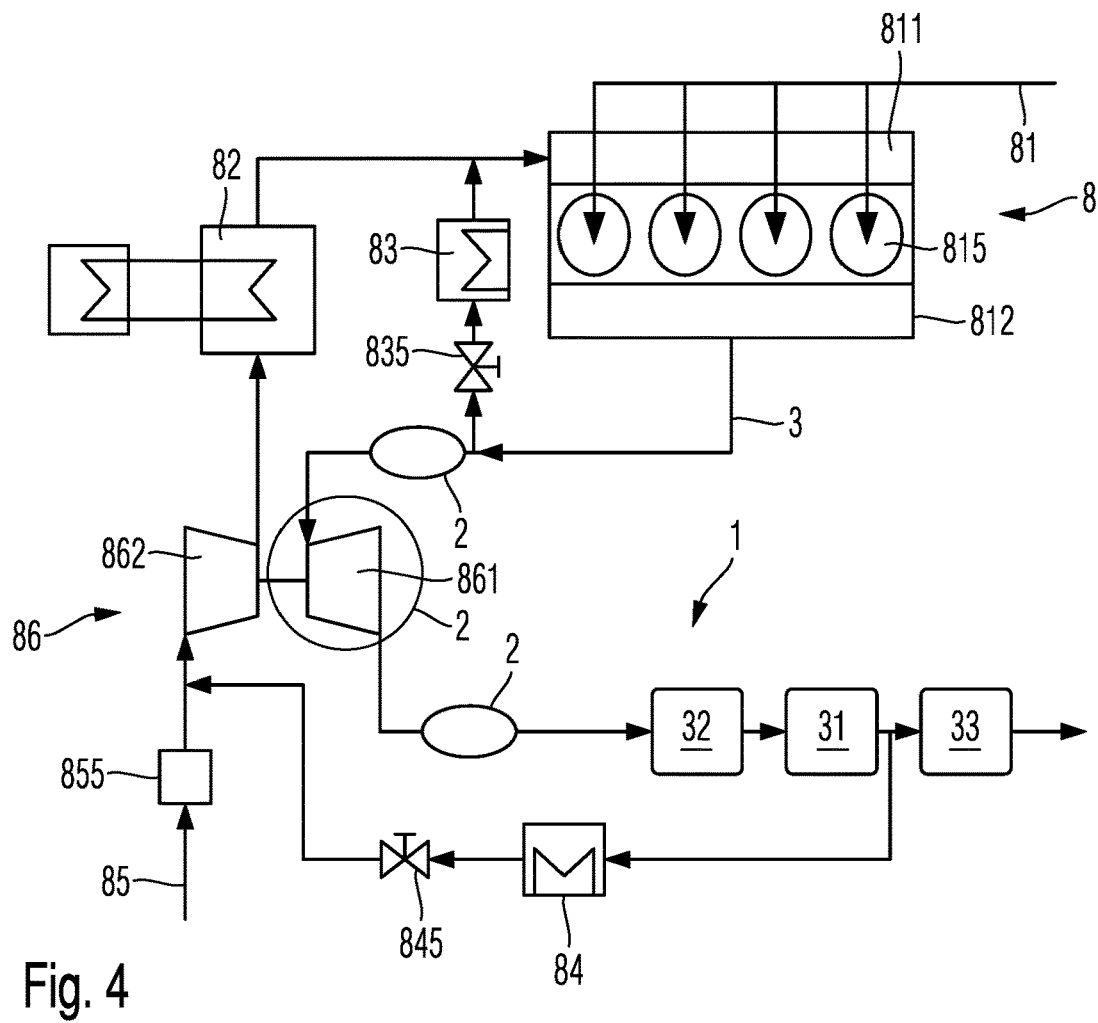
FIG. 4 illustrates exhaust emission control devices according to the invention by means of an internal combustion engine.

With reference to FIG. 4, an internal combustion engine 8 with its external mounting parts is shown by way of diagram. In the illustrated exemplary embodiment, the internal combustion engine 8 has four cylinders 815. The number of cylinders can, of course, be larger or also smaller in other embodiments of the invention. The invention is suitable for all conventional designs, for example in-line engines, boxer engines or V-engines. The illustrated 4-cylinder in-line engine is thus to be understood merely as an example. Furthermore, it may be a spark-ignition internal combustion engine or a self-ignition internal combustion engine.

Fuel is supplied to the internal combustion engine 8 via a line 81. The line 81 can, for example, be part of a common rail system or any other mixture preparation system known per se. Furthermore, the internal combustion engine 8 has an intake section 811, via which fresh air is supplied to the internal combustion engine 8. The exhaust gases are collected via an exhaust manifold 812 and supplied to the exhaust gas line 3.

FIG. 4 also shows an optional high-pressure exhaust gas recirculation system. It contains an exhaust gas recirculation valve 835, which controls in open-loop or closed-loop manner the recirculated exhaust gas amount, and an exhaust gas cooler 83, which extracts thermal energy from the recirculated exhaust gas and thus lowers its temperature. The high-pressure exhaust gas recirculation system discharges a partial flow of the exhaust gas from the exhaust gas line 3 and supplies it back into the intake section 811 in a cooled state.

The main flow of the exhaust gas is passed from the exhaust gas line 3 via the turbine 861 of an optional turbocharger 86. Of course, the turbocharger 86 can also be omitted in other embodiments of the invention. The exhaust gas is expanded in the turbine 861, thereby driving a compressor 862 via a shaft. The compressor 862 compresses the fresh air drawn in via an inlet 85 after it has been passed through an air filter 855 where it is cleaned of dirt particles.

The compressed air leaving the compressor 862 reaches an optional charge air cooler 82 before the compressed and cooled intake air is supplied to the internal combustion engine 8 via the intake section 811.

The exhaust gas leaving the turbine 861 reaches an exhaust gas after-treatment system which has three stages in the illustrated exemplary embodiment. It contains an oxidation catalyst 32 that oxidizes unburned fuel components and carbon monoxide so that substantially $CO_2$ and $H_2O$ escape from the oxidation catalyst 32.

The exhaust gas then reaches a particulate filter 31, which can be, for example, a diesel particulate filter known per se or a gasoline particulate filter. Soot particles produced by incomplete combustion in the cylinders 815 of the internal combustion engine 8 are retained in the particulate filter 31. When the particulate filter 31 is sufficiently loaded, the soot particles can be oxidized to form $CO_2$. This requires exhaust gas temperatures between 350° C. and 600° C.

Finally, FIG. 4 shows an optional SCR catalyst 33, in which nitrogen oxides from the exhaust gas flow are reduced with urea. The reaction of the nitrogen oxides requires temperatures above 200° C., preferably above 250° C.

Finally, FIG. 4 shows an also optional low-pressure exhaust gas recirculation system, which branches off exhaust gas downstream of the particulate filter 31, lowers the temperature via an optional exhaust gas cooler 84, and feeds the cooled exhaust gas to the low-pressure side of the compressor 862. Another exhaust gas recirculation valve 845 is available to control the recirculated mass flow.

It is understood that FIG. 4 shows the maximum configuration with peripheral devices. In other embodiments of the invention, individual peripheral devices can also be omitted; for example, a turbocharger 86, a charge air cooler 82, an exhaust gas recirculation system 83 and 84 or a multistage exhaust emission control 31, 32 and 33 need not be provided in every case. Individual elements can also be omitted.

The object of the invention is now to rapidly bring the oxidation catalyst 32 and/or the particulate filter 31 and/or the SCR catalyst 33 to the required operating temperature even in part-load operation and/or after a cold start. For this purpose, the heated catalyst assembly according to the invention can be used at the points designated by reference sign 2. The heated catalyst assembly can thus be inserted into the exhaust gas line 3 either upstream or downstream of the turbine 861 of the turbocharger 86. In other embodiments of the invention, the heated catalyst assembly 2 can be integrated into the exhaust gas line 3 upstream or downstream of the turbocharger 86.

Figure 5:
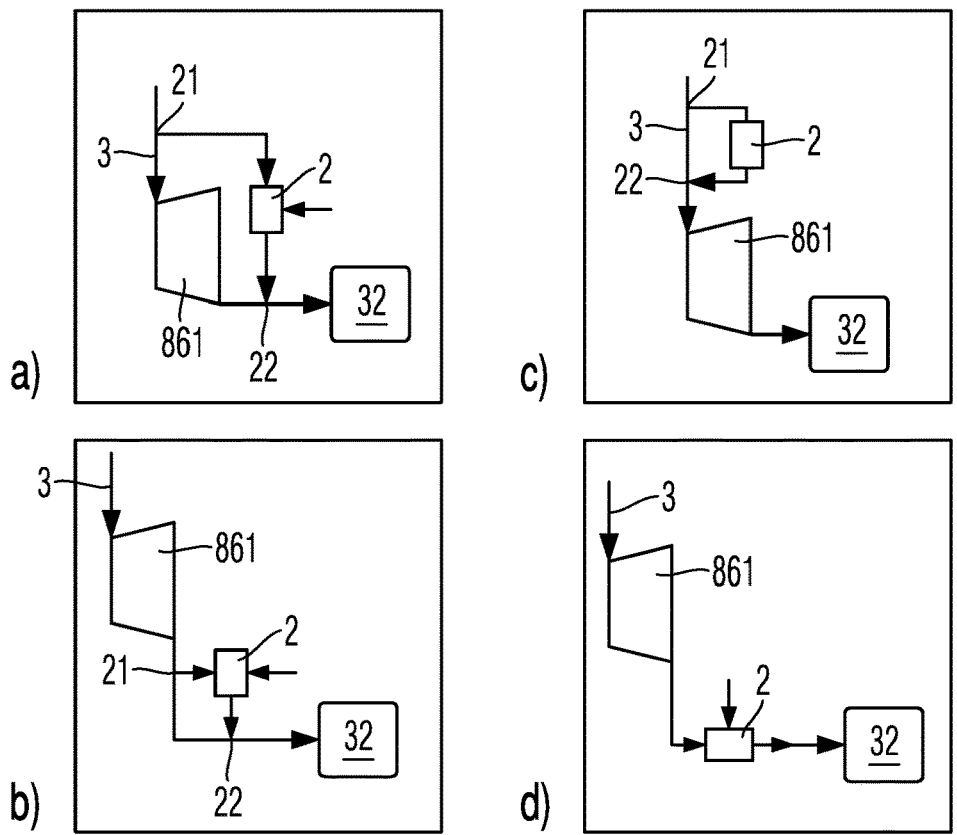
FIG. 5 illustrates different installation variants of the heated catalyst assembly according to the invention.

Various installation situations of the heated catalyst assembly 2 are explained in more detail with reference to FIG. 5. The design of the heated catalyst is assembly here substantially based on the three different embodiments of the invention, which are shown in FIGS. 1, 2 and 3 or FIGS. 6 and 7 or FIGS. 8 and 9.

FIG. 5a shows the installation of a heated catalyst assembly 2 parallel to the turbine 861 of turbocharger 86. In this case, the pressure loss occurring in turbine 861 ensures that an exhaust gas pressure present at the inlet 21 of the heated catalyst assembly 2 is higher than that at the outlet 22. As a result, a partial flow 351 of the exhaust gas is conveyed through the heated catalyst assembly 2. The turbulence of the exhaust gas after leaving the turbine 861 also ensures sufficiently good mixing of the fuel vapor or reformate generated in the heated catalyst assembly 2 with the main stream of the exhaust gas flowing through the turbine 861.

FIG. 5b shows an installation variant of the heated catalyst assembly 2 on the low-pressure side of the exhaust gas stream, i.e. after leaving the turbine 861 of the turbocharger 86. The embodiment of the invention shown in section in FIG. 2 and using a mixer is suitable for this purpose, for example. An advantage is the universal usability of the heated catalyst assembly for a plurality of vehicle types.

FIG. 5c shows the installation of a heated catalyst assembly 2 on the high-pressure side of the exhaust gas set, i.e. upstream of the turbine 861 of the turbocharger 86. This has the advantage that the turbine of the turbocharger 861 allows good mixing of the main stream with the partial stream leaving the heated catalyst assembly 2 and containing fuel vapor.

Finally, FIG. 5d shows the integration of the heated catalyst assembly 2 into the exhaust gas line directly upstream of the exhaust gas after-treatment system to be heated. The embodiment shown in FIGS. 6 to 9 is particularly suitable for this purpose. In this embodiment, the heated catalyst assembly 2 is arranged completely inside the exhaust gas line 3 and, being protected from damage, can thus also be arranged on the vehicle floor.

Figure 6:
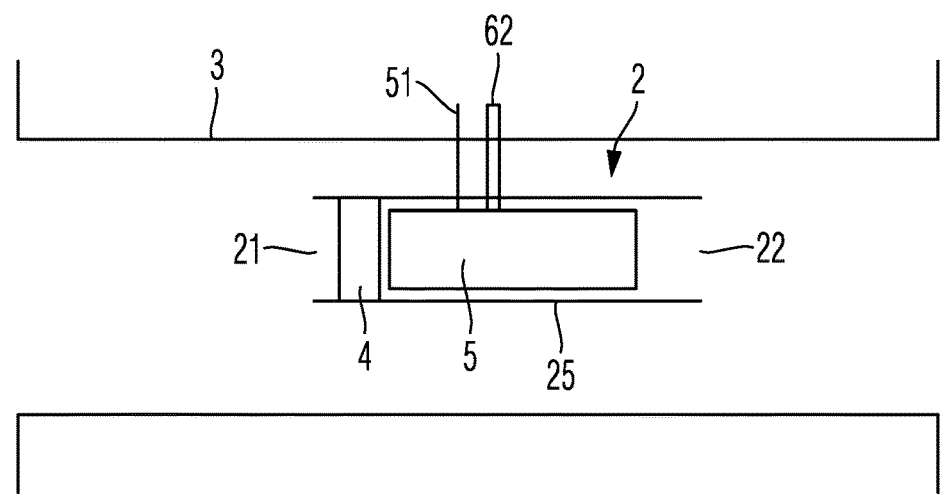
FIG. 6 shows a longitudinal section of a heated catalyst assembly according to the invention in a second embodiment.

FIGS. 6 and 7 show a second embodiment of the heated catalyst assembly according to the invention. Equal components of the invention are provided with equal reference signs so that the description is limited to the essential differences. FIG. 6 shows a longitudinal section and FIG. 7 a cross-section.

As is clear from the drawings, the heated catalyst assembly 2 is again arranged in an approximately cylindrical housing. The housing is arranged approximately concentrically to the exhaust gas line 3. For this purpose, the diameter of the exhaust gas line 3 in the area of the heated catalyst assembly 2 can be larger than in other longitudinal sections of the exhaust gas line 3. The inlet 21 and the outlet 22 of the housing 25 are arranged on opposite ends of the cylindrical housing 25. Therefore, the exhaust gas flows into the housing 25 through the front side thereof and out again through the rear side thereof. As a result, the exhaust gas always flows through the housing 25 when the internal combustion engine is in operation. Due to the largely homogeneous flow of exhaust gas, the perforated plate 4 can also be omitted in these embodiments. As shown in FIGS. 6 and 7 as an example of an exhaust pipe, the heated catalyst assembly can also be integrated into the housing of an exhaust gas catalytic converter or a particulate filter.

With reference to FIGS. 8 and 9, a third embodiment of the invention is explained in more detail. Equal components of the invention are provided with equal reference signs so that the description is limited to the essential differences. Again, the longitudinal section is shown in FIG. 8 and the cross-section in FIG. 9.

As can be seen, the housing of the heated catalyst assembly 2 is not located approximately concentrically in the center of the exhaust gas line 3, but at its edge where it is separated from the remaining free cross-section of the exhaust gas line 3 by a flat or curved partition 251. This embodiment has the advantage that the connecting contacts 51 of an electrical heating device and the fuel supply 62 do not have to be passed through the hot exhaust gas zone. In this case, too, a perforated plate 4 can be omitted under certain circumstances since the catalyst support 5 already has a homogeneous flow anyway. As shown in FIGS. 8 and 9 by way of example for an exhaust gas pipe, the heated catalyst assembly can also be integrated into the housing of an exhaust gas catalytic converter or a particulate filter.

Figure 19:
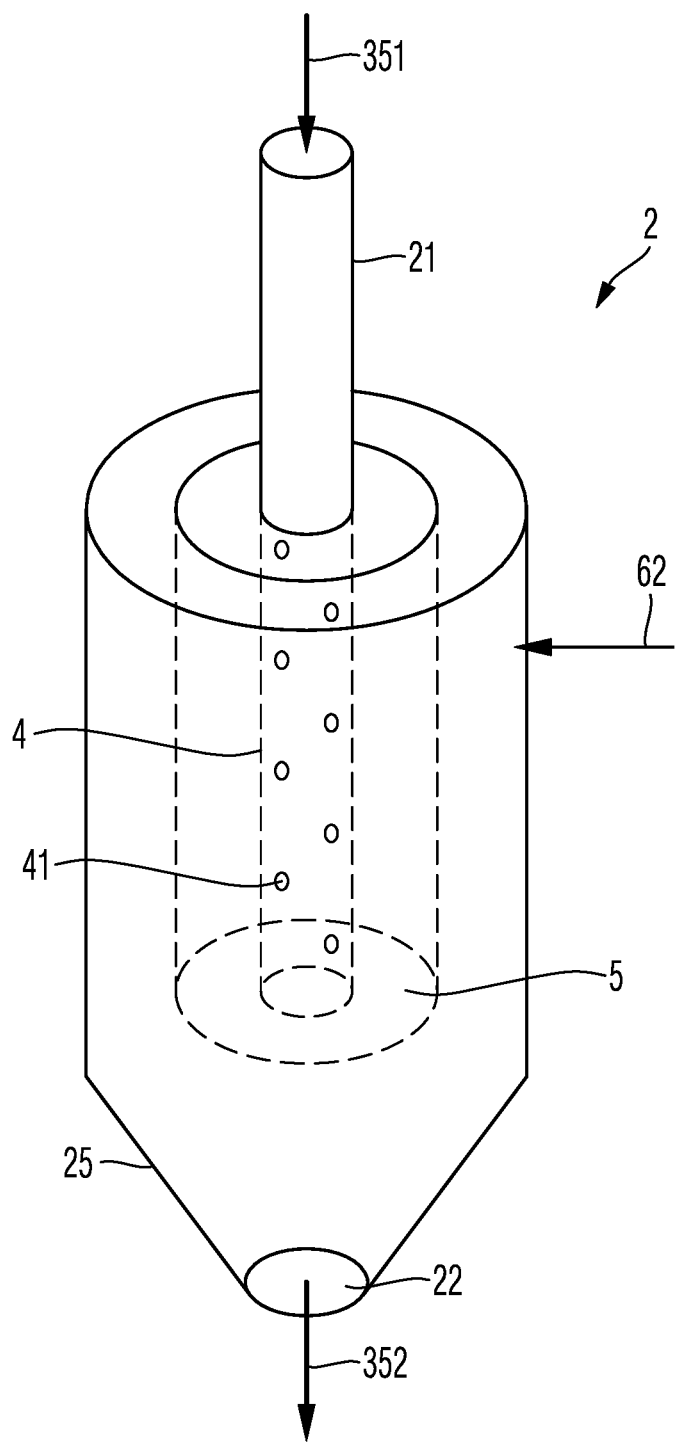
FIG. 19 shows a fourth embodiment of a heated catalyst assembly according to the invention.

FIG. 19 shows a fourth embodiment of a heated catalyst assembly according to the invention. Equal components of the invention are provided with equal reference signs so that the description is limited to the essential differences.

As is clear from FIG. 19, the heated catalyst assembly has an approximately cylindrical housing 25, the inlet 21 and the outlet 22 being arranged axially. As also shown in FIG. 19, the exhaust gas stream 351 entering through the inlet 21 is supplied to the catalyst support 5 via a perforated plate 4 in the form of a cylinder jacket surface. The perforated plate 4 can contain or consist of a ceramic material, a metal or an alloy. In some embodiments of the invention, the perforated plate 4 can be formed by a longitudinal section of the pipe forming the inlet 21. The perforated plate 4 further includes a plurality of holes or openings 41 through which the exhaust gas can pass. The number, size and distribution of the holes 41 can be determined in an optional computer simulation in such a way that the exhaust gas is distributed as homogeneously as possible in the catalyst support 5. In some embodiments of the invention, the end of the pipe forming the inlet 21 can be closed so that the exhaust gas only exits through the openings 41.

In a manner known per se, the catalyst support 5 can be, for example, a sintered body, a honeycomb body, a foam or another porous shaped body which is permeable to exhaust gas. For this purpose, the catalyst support 5 can be made of a metal, an alloy or a ceramic material. The catalyst support 5 also has the form of a cylinder jacket surface and is arranged approximately concentrically around the cylindrical perforated plate 4 and/or approximately concentrically to the housing 25.

Finally, the side of the catalyst support 5 opposite the perforated plate includes a fuel plate which is also concentric and to which fuel is applied via a fuel supply 62.

In some embodiments of the invention, a fuel plate can also be omitted if the fuel is applied directly to the catalyst support 5. When fuel is applied directly to the catalyst support 5, the fuel can be introduced in gaseous form. For this purpose, a liquid fuel can be introduced into the heated catalyst assembly via an evaporator (not shown). This avoids or reduces undesirable cooling of the catalyst support 5 due to the enthalpy of vaporization of the fuel.

In some embodiments, the fuel supply 62 can be available multiple times so that fuel can be introduced at multiple locations along the circumference and/or along the longitudinal extension. The merely schematic illustration of only one fuel supply 62 should only be understood as explanatory.

The following comparative examples illustrate the invention, but should not be understood to the effect that the invention is limited thereto. In the following examples, an exhaust emission control device is used as described in FIGS. 1 to 4.

As already described above, the heated catalyst assembly according to the invention can have a first operating state in which fuel with comparatively long-chain hydrocarbons is reacted in the heated catalyst assembly. The resulting reformate can already be reacted at lower temperatures on a component of an exhaust gas after-treatment system, e.g. an oxidation catalyst, and thus generate heat directly in the exhaust gas set or the exhaust gas after-treatment system. In addition, the heated catalyst assembly according to the invention can be operated in a second operating state in which the fuel is largely or completely oxidized in order to introduce heat into the exhaust gas by exothermic reaction.

Figure 10:
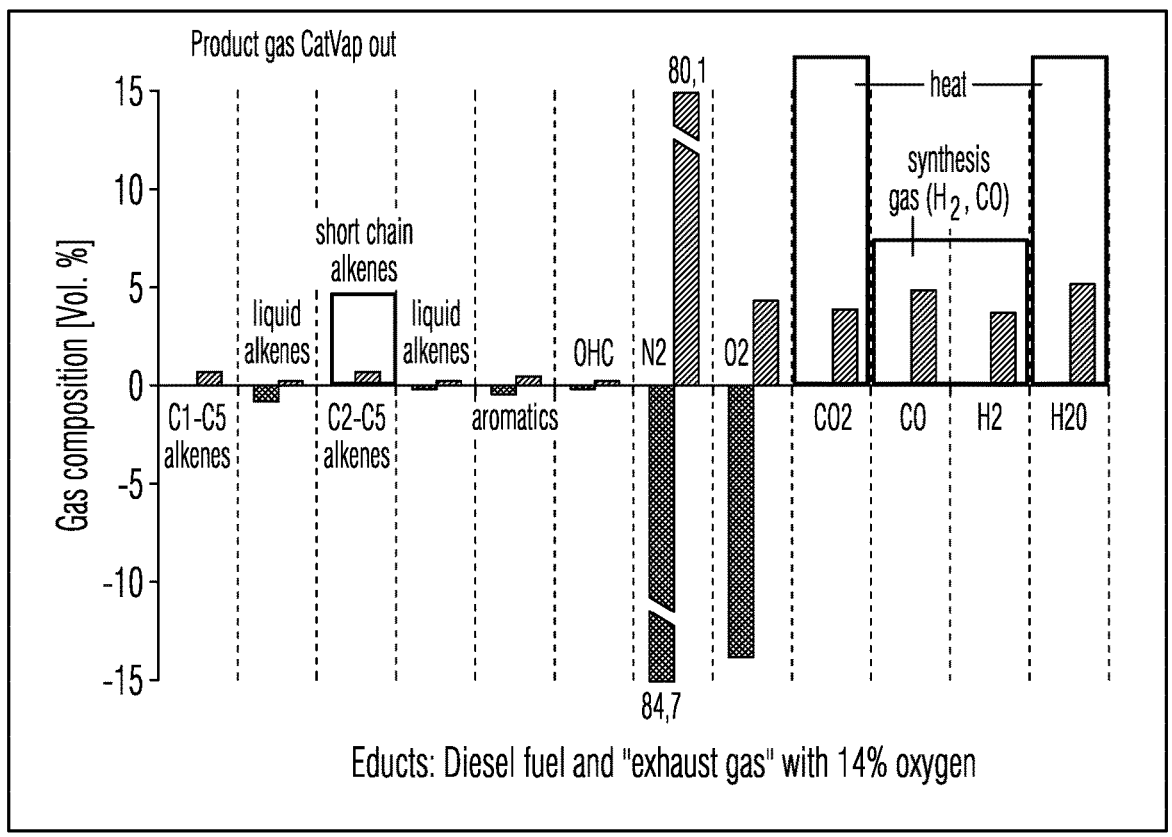
FIG. 10 shows the mass flows supplied to the heated catalyst assembly and the composition of the reformate generated in the heated catalyst assembly.

FIG. 10 shows on the positive ordinate the composition of the reformate generated by the heated catalyst assembly in the first operating state. The negative ordinate shows the composition of the mass flows supplied to the heated catalyst assembly.

FIG. 10 shows the results of a test operation in which the exhaust gas stream is simulated by a mixture of 14% oxygen and 84.7% nitrogen. This simulated exhaust gas stream is supplied to the heated catalyst assembly in the manner described above. In addition, commercially available diesel fuel is supplied to the heated catalyst assembly and consists essentially of a mixture of alkanes, alkenes, aromatics and oxygenated hydrocarbons. At room temperature, the alkanes consist of gaseous components having about 1 to 5 carbon atoms and liquid alkanes having more than 6 carbon atoms.

Inside the heated catalyst assembly, the diesel fuel is reacted with the exhaust gas. This produces heat and oxidation products, such as hydrogen and carbon monoxide. In addition, the fuel is cracked into short-chain alkenes, such as propane and ethylene. The resulting reformate contains almost no liquid alkanes that can be condensed at room temperature. As a result, the ignition temperature on an oxidation catalyst of an exhaust gas after-treatment system is reduced. Thus, heat can be generated directly in the exhaust gas after-treatment system by oxidation of the reformate, which heats the downstream components of the exhaust gas after-treatment system, e.g. a particulate filter. The heating power thus produced can be greater than about 10 kW or greater than about 15 kW or greater than about 20 kW or greater than about 25 kW or greater than about 30 kW.

Figure 11:
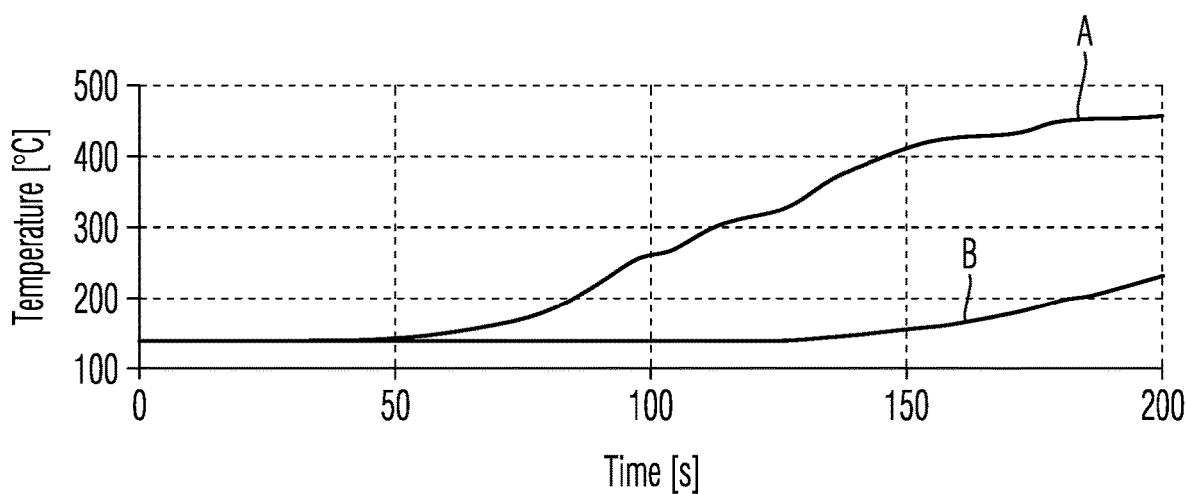
FIG. 11 shows the temperature of an oxidation catalyst and of a particulate filter after a cold start against time.

FIG. 11 shows the temperature of a particulate filter 31 in curve B and the temperature of an oxidation catalyst 32 in curve A of an exhaust gas after-treatment system of a passenger car with diesel engine. The exhaust gas stream was set to 50 kg/h and a constant temperature of 140° C. FIG. 11 shows the temperature curve against time. After about 40 seconds, the reformate described above on the basis of FIG. 10 was introduced into the exhaust gas set. The temperature of the oxidation catalyst then rises to a value of over 200° C. within about 35 seconds. Over the course of another two minutes, the oxidation catalyst continues to heat to temperatures of about 450° C.

Heat is released from the oxidation catalyst 32 into the downstream particulate filter 31. As FIG. 11 shows, the particulate filter already reaches a temperature of more than 200° C. about 3 minutes after the cold start and about 140 seconds after the reformate addition. The heating power generated in this way by the heated catalyst assembly according to the invention is about 6 kW.

Figure 12:
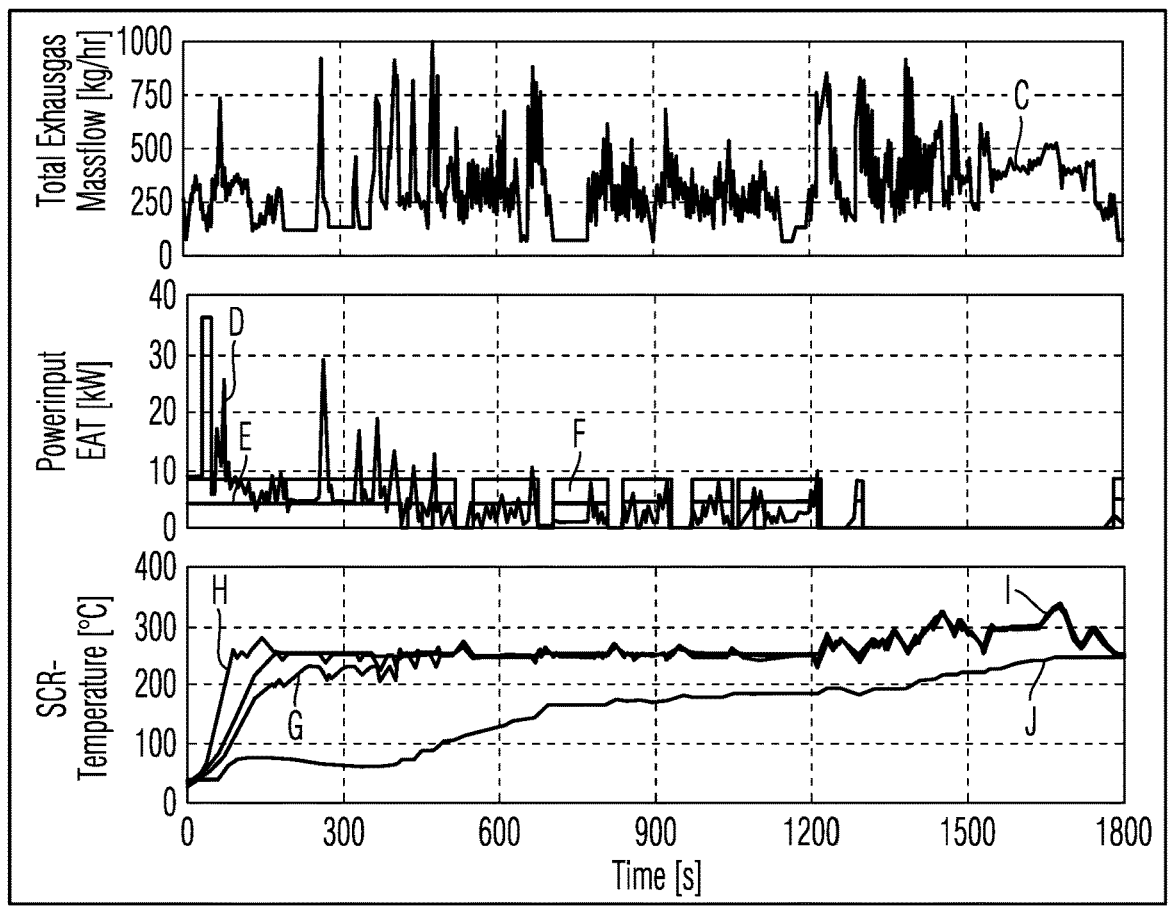
FIG. 12 shows the entire exhaust gas mass flow, the thermal power supplied to the exhaust gas after-treatment system and the resulting SCR temperature against time.
Figure 13:
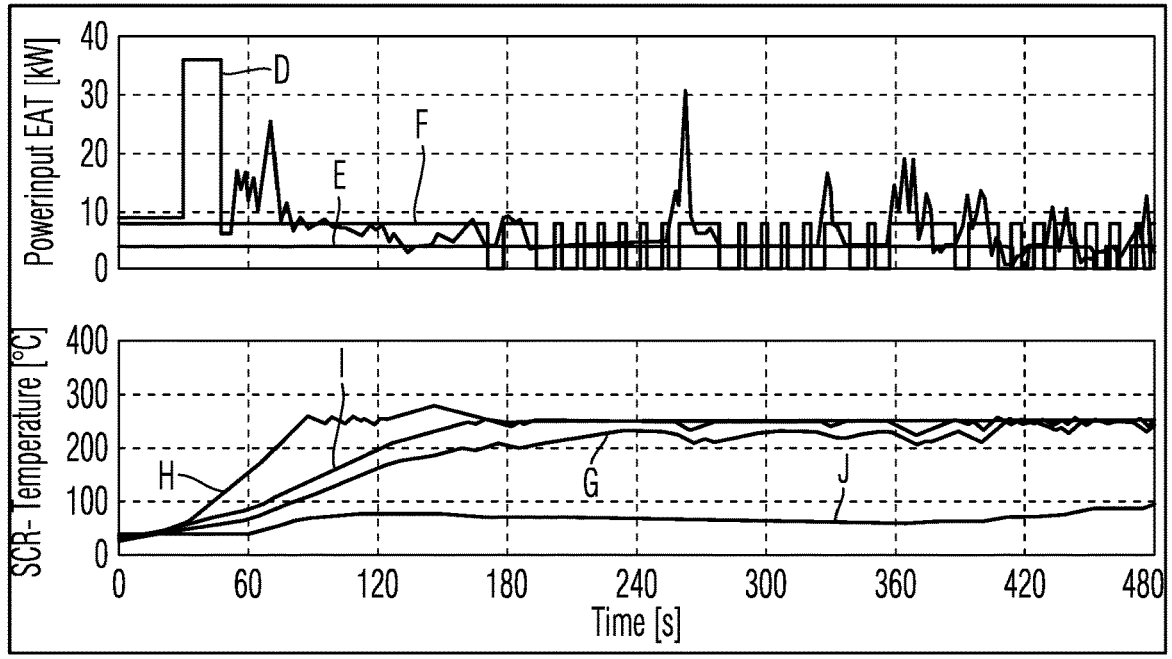
FIG. 13 shows the thermal power supplied to the exhaust gas after-treatment system and the resulting SCR temperature against time for the first 480 seconds of a WHTC measurement cycle.

FIG. 12 shows the exhaust gas mass flow in curve 10. The heating power supplied to the exhaust gas after-treatment system is shown in the middle part of the drawing. Here, curve D denotes the heating power provided by the heated catalyst assembly according to the invention. As a comparative example, the heating power of electric heating with 4 kW is shown in curve E, and electric heating with 8 kW in curve F. Finally, FIG. 12 shows the temperature of an SCR catalyst against time. Curve H shows the temperature curve for heating with a heated catalyst assembly according to the invention, curve G shows the temperature curve for electric heating with 4 kW, curve I shows the temperature curve for an electric heating with 8 kW, and curve J shows the temperature curve without further heating measures. In each case, the time curve is shown for the first 30 minutes after the cold start during a WHTC test cycle. FIG. 13 shows an enlarged view of the first 480 seconds of the test cycle shown in FIG. 12.

As is clear from curve D, the heated catalyst assembly according to the invention provides, in the second operating state, a heating power of about 9 kW from the start. After a few tens of seconds, the oxidation catalyst of the exhaust gas after-treatment system is heated to such an extent that the heated catalyst assembly can switch to the first operating state. In the first operating state, a heating power of about 36 kW is output. The heating power is then reduced within the next two minutes. This sometimes results in fluctuations due to the fluctuating exhaust gas mass flow which is supplied to the heated catalyst assembly.

As is clear from figure H, the high heating power of the heated catalyst assembly according to the invention results in a temperature of more than 200° C. being reached at the SCR catalyst after just 70 seconds, which allows an efficient cleaning of nitrogen oxides in the exhaust gas.

By comparison, the same temperature or cleaning effect is only achieved after more than two minutes with an electric heating power of 8 kW. If the electric heating power is reduced further to 4 kW, which is already the limit of a 12-volt on-board power supply, the SCR catalyst reaches a temperature of 200° only after 180 seconds. A temperature of 250° is reached only after 420 seconds. In contrast, the heated catalyst assembly according to the invention allows a temperature of more than 250° C. at the SCR catalyst already after about 80 seconds. Compared with electric heating at 4 kW, the full function of the SCR catalyst thus starts more than five minutes earlier when the heated catalyst assembly according to the invention is used.

As FIG. 12 further shows in curve J, an SCR catalyst does not reach its full operating temperature of 250° C. until after a 30-minute ride if no heating device is used. In other words, the nitrogen oxide reduction in the exhaust gas is not possible at all during the first 30 minutes of a ride and thus in short-distance driving.

Figure 14:
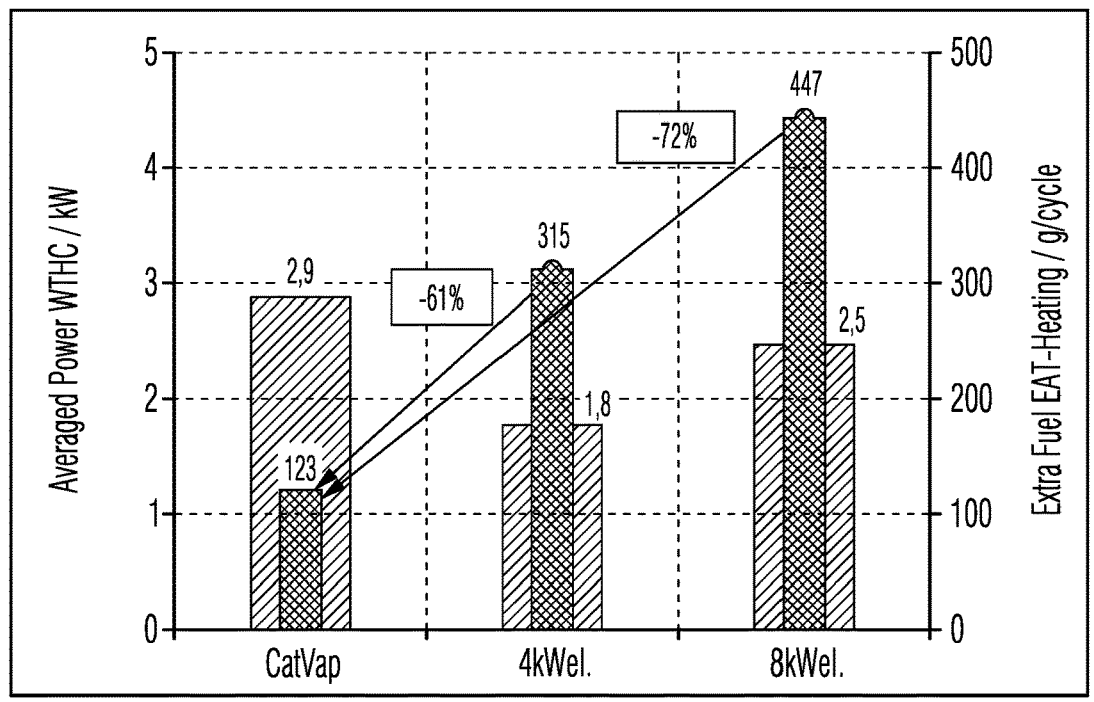
FIG. 14 shows the integral of the heating power for electrical heating devices and the heated catalyst assembly according to the invention when heating an SCR catalyst in the WHTC cycle as well as the fuel amount respectively used for heating.

FIG. 14 shows the integrated heating power of the three heating devices compared in FIGS. 12 and 13 with one another over the entire WHTC test cycle. The heated catalyst assembly according to the invention was here operated in such a way that the SCR catalyst was heated up to operating temperature as quickly as possible. The fastest possible heating results from an operating control that operates the heated catalyst assembly in the second operating state until an oxidation catalyst arranged upstream of the SCR catalyst has reached a temperature of about 160° C. and subsequent switching to the first operating state, as explained in FIG. 13 by means of curve D.

As can be seen in FIG. 14, the heated catalyst assembly according to the invention here generates an average heating power of 2.9 kW over the entire WHTC test cycle. An additional fuel amount of 123 g is used for this purpose.

By comparison, an electrical heating device with a nominal output of 4 kW requires a fuel amount of 315 g during the WHTC test cycle for the operation to provide an average thermal output of 1.8 kW. If the electric heating power is doubled to nominally 8 kW, an average electric heating power of 2.5 kW is generated during the entire WHTC test cycle; however, a fuel amount of 447 g is required for this purse. Therefore, the fuel amount required to heat the exhaust gas after-treatment system is reduced by over 70% or over 60% when the heated catalyst assembly according to the invention is used compared to an electric heater, although the released heating power is considerably greater. This is due to the fact that the electric heating power in the motor vehicle must be provided by the driving engine and generator, which have a comparatively low efficiency.

As described above for an SCR catalyst, the heated catalyst assembly according to the invention can also be used to provide the heating power required for the regeneration of a particulate filter in all operating states, in particular also in operating states with low load.

Figure 15:
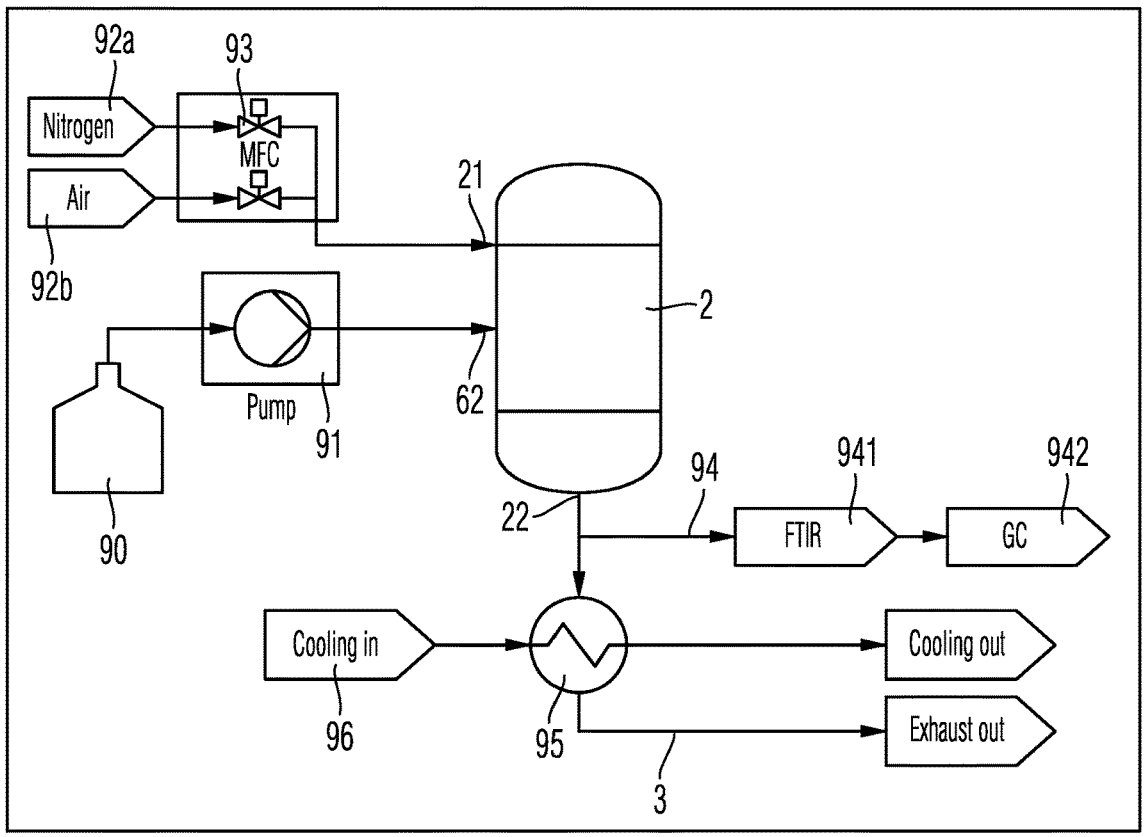
FIG. 15 shows a test stand for testing the heated catalyst assembly according to the invention.

With reference to FIG. 15, a test stand is explained in more detail with which the heated catalyst assembly 2 according to the invention can be tested under highly dynamic operating states such as occur in real operation in a motor vehicle.

Equal components of the invention are provided with equal reference signs so that the following description can be limited to the essential differences.

On the one hand, the exhaust gas of an internal combustion engine contains combustion gases, such as $H_2O$ and $CO_2$, which can be approximately regarded as inert gases. In the simulated, synthetic exhaust gas, this part is formed by nitrogen. In addition, the exhaust gas stream contains a varying proportion of oxygen, which is available for oxidation in the exhaust gas set. In order to simulate an exhaust gas stream in the test mode, the test stand has a reservoir 92a containing nitrogen and a reservoir 92b containing air. Both components can be metered via mass flow control 93 so that a gas stream with varying oxygen content between 0% and 21% is available as synthetic exhaust gas at the inlet 21 of the heated catalyst assembly 2.

This gas stream flows through the heated catalyst assembly 2 and leaves the heated catalyst assembly 2 via the outlet 22. Furthermore, the heated catalyst assembly 2 is supplied with commercially available diesel fuel via the connection 62, which fuel is delivered from a tank 90 by means of a metering pump 91.

Depending on the operating state of the heated catalyst assembly 2, the gas stream discharged at the outlet 22 essentially contains a hot inert gas stream or a reformate, as described above.

In order to analyze the reformate, a partial flow of the exhaust gas is supplied via line 94 to an analysis device which, in the illustrated exemplary embodiment, includes a Fourier transform infrared spectrometer 941 and a gas chromatograph 942. The remaining exhaust gas stream is cooled by an exhaust gas cooler 95 and discharged via an exhaust gas line 3. The heat of the exhaust gas is here at least partially transferred to a coolant stream 96, which can comprise, for example, a cooling gas stream and/or liquid cooling. By measuring the temperatures and mass flows of the exhaust gas stream and of the coolant stream, the heating power delivered by the heated catalyst assembly 2 can be determined.

Figure 16:
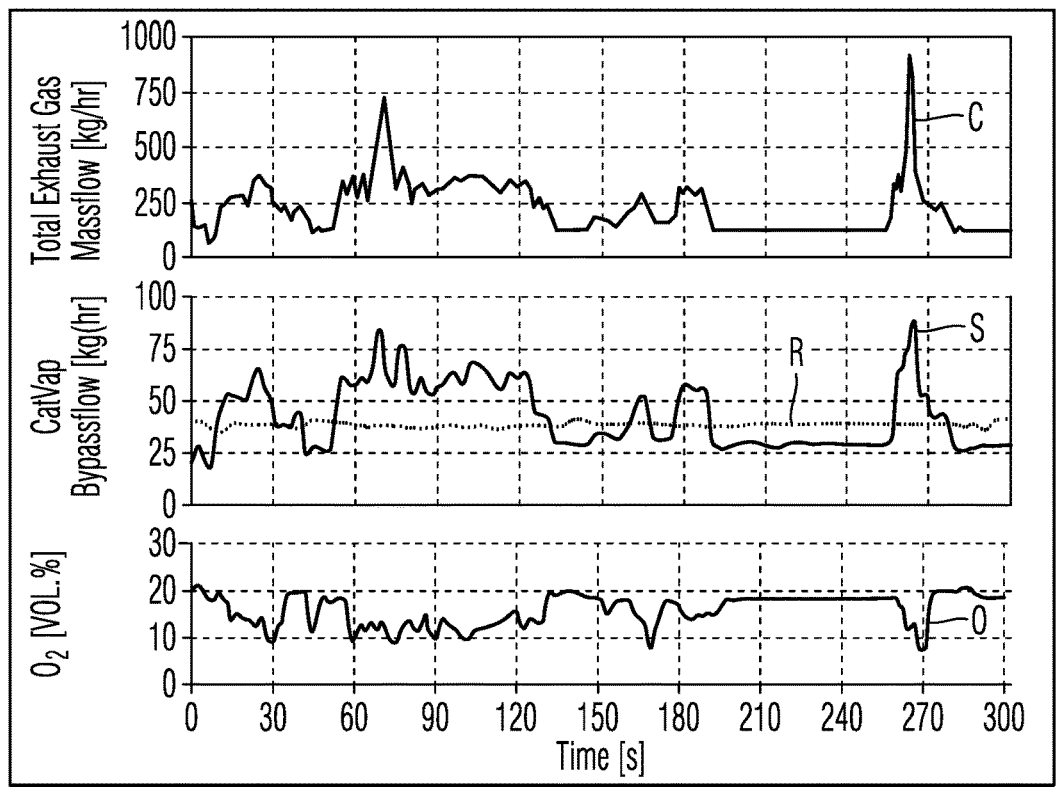
FIG. 16 shows the entire exhaust gas mass flow, the exhaust gas mass flow supplied to the heated catalyst assembly according to the invention, and the oxygen concentration contained therein against time.
Figure 17:
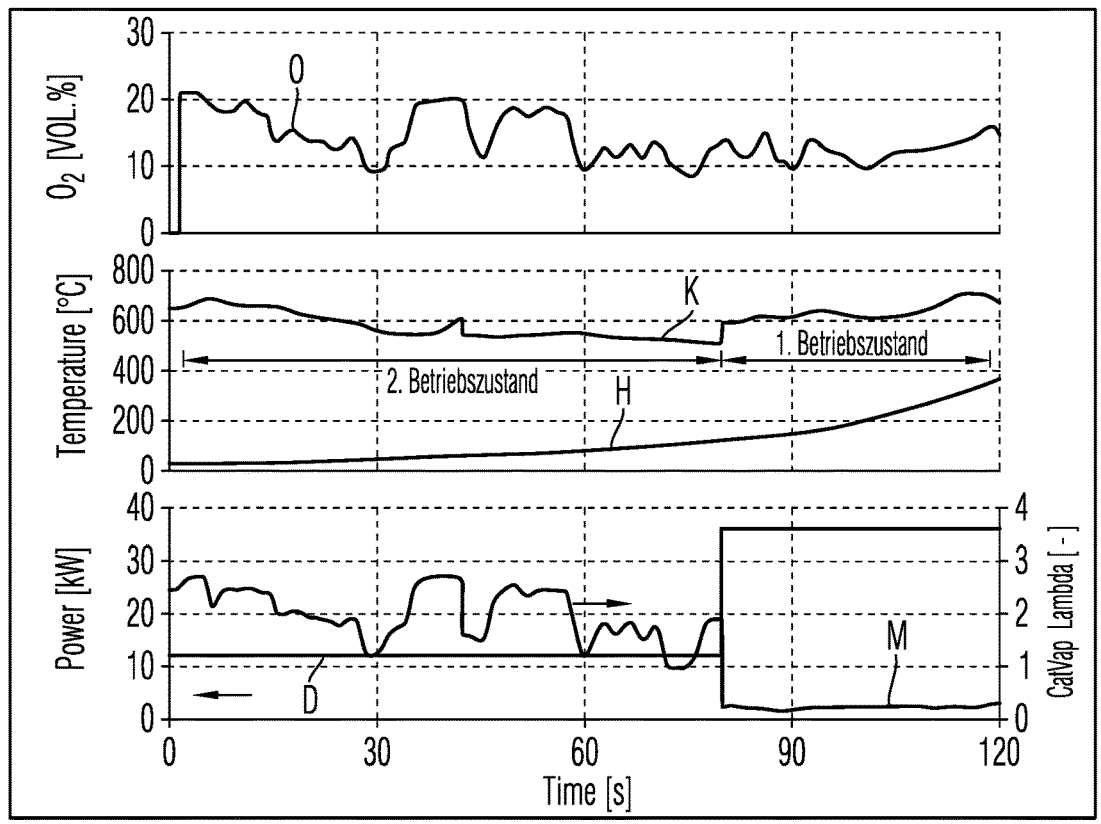
FIG. 17 shows the power supplied from the heated catalyst assembly, the oxygen concentration contained in the supplied exhaust gas mass flow and the temperature of the heated catalyst assembly against time.
Figure 18:
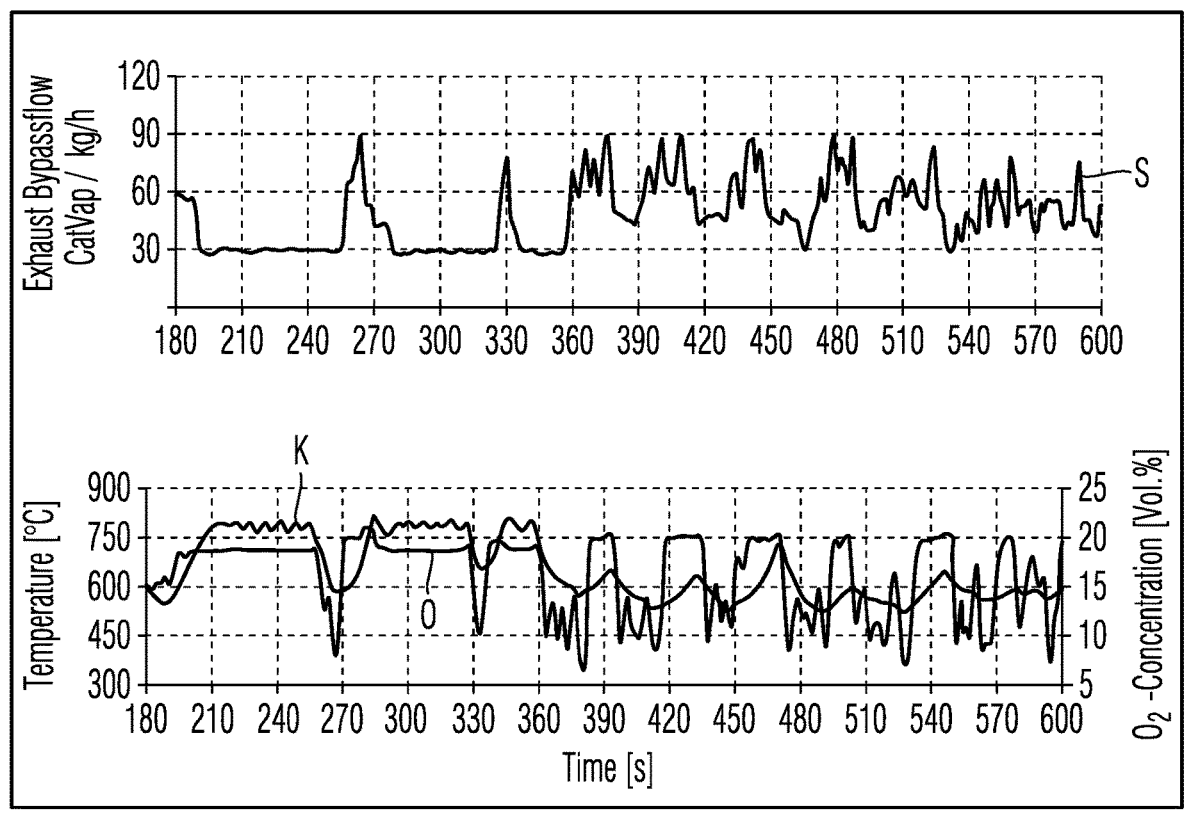
FIG. 18 shows the temperature of the heated catalyst assembly against time in the case of varying supplied exhaust gas mass flow and oxygen concentration.

FIGS. 16, 17 and 18 illustrate experimental results of the characterization of a heated catalyst assembly according to the present invention. They show the total exhaust gas mass flow in curve C, the partial flow supplied to the heated catalyst assembly with an uncontrolled pressure reduction device 7 in curve S, the partial flow supplied to the heated catalyst assembly with a controlled pressure reduction device 7 in curve R, the oxygen content of the exhaust gas in curve O, the temperature of an SCR catalyst in curve H, the temperature of the heated catalyst assembly in curve K, the air ratio X of the heated catalyst assembly in curve M, and the heating power delivered by the heated catalyst assembly in curve D. Here, FIG. 16 shows the progression of these variables over 300 seconds. FIG. 17 shows an enlarged view of the first two minutes. FIG. 18 shows the course during the third to the tenth minute.

As is clear from FIG. 16 and in particular FIG. 17, the heated catalyst assembly is operated in the second operating state during the first 80 seconds. The second operating state is characterized by a large excess of air so that the supplied fuel is completely oxidized and converted exothermically. As shown in curve D, the heating power is about 12 kW in this case. The supplied partial flow of the exhaust gas is about 40 kg/h.

After 80 seconds, the supplied exhaust gas mass flow is reduced to about 14 kg/h. The heated catalyst assembly is then located in the first operating state, in which a lower thermal power is generated directly in the heated catalyst assembly. However, the reformate generated in the heated catalyst assembly in this operating state causes, when reacted at an oxidation catalyst of the exhaust gas after-treatment system, the heat amount effectively supplied to an exhaust gas after-treatment system to increase to 36 kW. After about 110 seconds, the SCR catalyst has reached its operating temperature, rendering possible efficient exhaust emission control of nitrogen oxides.

As curve K in FIG. 17 shows, the outlet temperature at the outlet 22 of the heated catalyst assembly 2 responds very quickly to changing the operating state. Furthermore, FIGS. 16, 17 and 18 show that the heated catalyst assembly according to the invention is very resistant to variations in the exhaust gas mass flow and to variations in the oxygen concentration. With a supplied mass flow S between about 30 kg/h and about 90 kg/h and variations of the oxygen concentration between 7% and 20.5%, there are no adverse effects on the heating power supplied to the exhaust gas after-treatment system.

The above described application examples demonstrate that the heated catalyst assembly according to the invention can provide high heating power in the short term, with which an exhaust gas after-treatment system can be brought to operating temperature within very short times of, for example, less than 120 seconds or less than 100 seconds or less than 80 seconds. Compared with electrical heating devices, the fuel requirement for heating the exhaust gas after-treatment systems is reduced.

Of course, the invention is not limited to the illustrated embodiments. Therefore, the above description should not be regarded as restrictive but as explanatory. The following claims are to be understood in such a way that a stated feature is present in at least one embodiment of the invention. This does not exclude the presence of further features. If the claims and the above description define "first" and "second" embodiments, this designation is used to distinguish between two similar embodiments without determining a ranking order.

What is claimed is:

1. An exhaust emission control device (1), comprising:
at least one exhaust gas line (3) configured to convey exhaust gases;
a heated catalyst assembly (2) configured to receive and react a portion of the exhaust gases with a fuel supplied thereto, the heated catalyst assembly (2) comprising:
a housing (25) having a fuel supply connection (62), an inlet (21) and an outlet (22); and
a catalyst support (5) arranged in said housing (25), the catalyst support (5) having a first side (77) and a second side (79) opposite to the first side (77);
wherein:
said portion of the exhaust gases in said at least one exhaust gas line (3) is fed into the housing (25) through the inlet (21) and is supplied to the first side (77) of the catalyst support (5);
said fuel enters the housing (25) through the fuel supply connection (62) and is supplied to the second side (79) of the catalyst support (5), such that said portion of the exhaust gases and fuel are supplied to the catalyst support (5) in opposite directions; and
reaction products formed by the reaction of said portion of the exhaust gases with said fuel, are discharged from the housing (25) through the outlet (22) and back into the at least one exhaust gas line (3), downstream of the inlet (21); and
a particulate filter (31) and/or an exhaust gas catalytic converter (32) connected to the at least one exhaust line (3) downstream of the heated catalyst assembly (2);
wherein:
a pressure reduction device (7) is positioned in the exhaust gas line (3) between the inlet (21) and the outlet (22) of the heated catalyst assembly (2);
after a cold start, the pressure reduction device (7) is closed to establish a pressure difference between the inlet (21) and the outlet (22) such that a partial flow of the exhaust gas flow flows through the housing of the heated catalyst assembly; and
if a temperature of the exhaust gas is so high that additional heating of the exhaust emission control device is not required, the pressure reduction device (7) is opened to cause a pressure of the exhaust gas at the inlet (21) and the outlet (22) to be about the same.

2. The exhaust emission control device according to claim 1, further comprising:
a perforated plate (4) arranged on a first side of the heated catalyst assembly (2) and configured to permit said portion of the exhaust gases to pass therethrough.

3. The exhaust emission control device according to claim 2, further comprising:
a fuel plate (6) arranged on a second side of the heated catalyst assembly (2) that is opposite the first side where the perforated plate (4) is arranged.

4. The exhaust emission control device according to claim 3, further comprising a pump (65) configured to supply fuel to the heated catalyst assembly (2), via the fuel plate (6).

5. The exhaust emission control device according to claim 3, wherein the fuel plate (6) has a capillary transport arrangement configured to distribute fuel in a thin film over a surface of the fuel plate (6).

6. The exhaust emission control device according to claim 1, further comprising an air supply device configured to supply ambient air to the heated catalyst assembly (2).

7. The exhaust emission control device according to claim 1, wherein the pressure reduction device (7) is at least one from the group consisting of: a throttle valve, a mixer and a turbine (861) of a turbocharger (86).

8. The exhaust emission control device according to claim 1, wherein the housing (25) of the heated catalyst (2) is fully arranged inside the exhaust gas line (3).

9. The exhaust emission control device according to claim 1, wherein the housing (25) of the heated catalyst (2) is external to the exhaust gas line (3).

10. The exhaust emission control device according to claim 1, further comprising:
a perforated plate (4) arranged on a first side of the heated catalyst assembly (2) and configured to permit said portion of the exhaust gases to pass therethrough;
a fuel plate (6) arranged on a second side of the heated catalyst assembly (2); and
a pump (65) configured to supply fuel to the heated catalyst assembly (2), via the fuel plate (6).

11. The exhaust emission control device according to claim 10, further comprising:
a pressure reduction device (7) positioned in the exhaust gas line (3) between the inlet (21) and the outlet (22) of the heated catalyst assembly (2), wherein:
the pressure reduction device (7) comprises at least one from the group consisting of: a throttle valve, a mixer and a turbine (861) of a turbocharger (86).

12. An internal combustion engine (8) comprising an exhaust emission control device (1) according to claim 1.

13. A method of reducing nitrogen oxides in exhaust gases output by an internal combustion engine, the method, comprising:
providing an exhaust emission control device (1) in accordance with claim 1;
reacting a fuel with a portion of said exhaust gases in the heated catalyst assembly (2) to create reaction products for heating exhaust gases flowing downstream in the exhaust gas line (3); and
supplying the heated exhaust gases to said particulate filter (31) and/or said exhaust gas catalytic converter (32) to reduce a level of nitrogen oxides in the exhaust gases.

14. A method for exhaust emission control, the method comprising:
supplying exhaust gas to an exhaust emission control device having at least one exhaust gas line (3) such that the exhaust gas is supplied to at least one particulate filter (31) and/or at least one exhaust gas catalytic converter (32, 33):
providing a heated catalyst assembly (2) upstream of the particulate filter (31) or the exhaust gas catalytic converter (32, 33), the heated catalyst assembly (2) having a housing (25) which has a catalyst support (5) therein, a fuel supply connection (62), an inlet (21) and an outlet (22) and which is connected to the exhaust gas line (3) in such a way that a portion of the exhaust gas flowing in the exhaust gas line (3) is supplied through the inlet (21) into the housing (25) and is discharged from the housing (25) through the outlet (22) back into the exhaust gas line (3) downstream of the inlet (21);

providing a pressure reduction device (7) in the at least one exhaust line (3), between the inlet (21) and the outlet (22) of the heated catalyst assembly (2);

supplying the heated catalyst assembly (2) with said portion of the exhaust gas through the inlet (21) to a first side (77) of the catalyst support (5);

supplying the heated catalyst assembly (2) with fuel through the fuel supply connection (62) to a second side (79) of the catalyst support (5), the second side (79) being opposite to the first side (77), such that the fuel and said portion of the exhaust gas are supplied to the catalyst support (5) in opposite directions;

at least partially reacting said fuel with said portion of the exhaust gas to create reaction products for heating exhaust gas flowing downstream in the exhaust gas line (3); and supplying the heated exhaust gas to the particulate filter (31) or the exhaust gas catalytic converter (32, 33);

the method further comprising:

after a cold start, controlling the pressure reduction device (7) to be closed to establish a pressure difference between the inlet (21) and the outlet (22) to have a partial flow of the exhaust gas flowthrough the housing of the heated catalyst assembly; and if a temperature of the exhaust gas is so high that additional heating of the exhaust emission control device is not required, controlling the pressure reduction device (7) to be opened to prevent additional heating of the exhaust emission control device.

15. The method according to claim 14, comprising:
at least temporarily electrically heating the catalyst support (5) of the heated catalyst assembly (2).

16. The method according to claim 14, comprising:
in a first operating state, predominantly oxidizing the fuel with the exhaust gas; and
in a second operating state, predominantly reacting the fuel to form a reformate.

17. The method according to claim 14, comprising:
supplying said portion of the exhaust gas to the heated catalyst assembly (2) via at least one perforated plate (4) arranged on a first side of the heated catalyst assembly (2).

18. The method according to claim 17, comprising:
applying the fuel to a fuel plate (6) which is arranged on a second side of the heated catalyst assembly (2) that is opposite to the first side where the perforated plate (4) is arranged.

19. The method according to claim 14, comprising:
introducing said portion of said exhaust gas into the heated catalyst assembly (2) upstream of a pressure reduction device (7); and
discharging said reaction products from the heated catalyst assembly (2) back into the exhaust gas line (3) downstream of the pressure reduction device (7).

20. The method according to according to claim 19, wherein:
the pressure reduction device (7) is at least one from the group consisting of a throttle valve, a mixer and a turbine (861) of a turbocharger (86).

21. A method for exhaust emission control, the method comprising:

supplying exhaust gas to an exhaust emission control device having at least one exhaust gas line (3) such that the exhaust gas is supplied to at least one particulate filter (31) and/or at least one exhaust gas catalytic converter (32, 33);

providing a heated catalyst assembly (2) upstream of the particulate filter (31) or the exhaust gas catalytic converter (32, 33), the heated catalyst assembly (2) having a catalyst support (5) and being located in a housing (25) which has an inlet (21) and an outlet (22) and which is connected to the exhaust gas line (3) in such a way that a portion of the exhaust gas flowing in the exhaust gas line (3) is supplied through the inlet (21) into the housing (25) and is discharged from the housing (25) through the outlet (22) back into the exhaust gas line (3) downstream of the inlet (21), said portion of the exhaust gas thus traveling through the housing (25) along a path which is parallel to the exhaust gas line (3);

providing a pressure reduction device (7) in the at least one exhaust line (3), between the inlet (21) and the outlet (22) of the heated catalyst assembly (2);

supplying the heated catalyst assembly (2) within the housing (25) with fuel, and said portion of said exhaust gas, said portion of the exhaust gas being supplied to a first side of the catalyst support (5), and the fuel being supplied to a second, opposite side of the catalyst support (5), such that said portion of the exhaust gas and the fuel are supplied in opposite directions;

at least partially reacting said fuel with said portion of the exhaust gas to create reaction products for heating exhaust gas flowing downstream in the exhaust gas line (3); and supplying the heated exhaust gas to the particulate filter (31) or the exhaust gas catalytic converter (32, 33); the method further comprising;

in a first operating state, predominantly oxidizing the fuel with the exhaust gas; and in a second operating state, predominantly reacting the fuel to form a reformate;

wherein the pressure reduction device (7) is configured to be closed after a cold start to establish a pressure difference between the inlet (21) and the outlet (22) to have a partial flow of the exhaust gas flow flows through the housing of the heated catalyst assembly; and the pressure reduction device (7) is configured to be opened, if a temperature of the exhaust gas is so high such that additional heating of the exhaust emission control device is not required.

* * * * *